United States Patent
Matsuo et al.

(10) Patent No.: US 11,916,837 B2
(45) Date of Patent: Feb. 27, 2024

(54) DISTRIBUTED STATION, AGGREGATION STATION, TERMINAL, AND COMMUNICATION METHOD

(71) Applicant: Panasonic Corporation, Osaka (JP)

(72) Inventors: Hidenori Matsuo, Kanagawa (JP); Yuta Seki, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 271 days.

(21) Appl. No.: 17/459,631

(22) Filed: Aug. 27, 2021

(65) Prior Publication Data

US 2022/0069963 A1    Mar. 3, 2022

(30) Foreign Application Priority Data

Aug. 31, 2020  (JP) ................................ 2020-145666

(51) Int. Cl.
*H04L 5/00*  (2006.01)
*H04W 4/30*  (2018.01)
*H04W 4/40*  (2018.01)

(52) U.S. Cl.
CPC .......... *H04L 5/0053* (2013.01); *H04L 5/0032* (2013.01); *H04W 4/40* (2018.02)

(58) Field of Classification Search
CPC ....... H04L 5/0053; H04L 5/0032; H04W 4/30
See application file for complete search history.

(56) References Cited

U.S. PATENT DOCUMENTS

| | | | | |
|---|---|---|---|---|
| 2020/0092685 | A1* | 3/2020 | Fehrenbach | H04W 84/047 |
| 2021/0014893 | A1* | 1/2021 | Park | H04W 72/27 |
| 2021/0235491 | A1* | 7/2021 | Iyer | H04W 72/23 |
| 2022/0086897 | A1* | 3/2022 | Wei | H04W 74/0833 |
| 2022/0124657 | A1* | 4/2022 | Baldemair | H04W 56/0015 |
| 2022/0191934 | A1* | 6/2022 | Miao | H04W 74/0833 |
| 2022/0286198 | A1* | 9/2022 | Khan | H04B 7/1855 |

FOREIGN PATENT DOCUMENTS

CN    110831170    *  2/2020  ........ H04W 72/0453

OTHER PUBLICATIONS

NGMN Alliance, "NGMN Overview on 5G RAN Functional Decomposition," Version 1.0, Feb. 24, 2018, 48 pages.

* cited by examiner

*Primary Examiner* — Diane L Lo
*Assistant Examiner* — Abusayeed M Haque
(74) *Attorney, Agent, or Firm* — Seed IP Law Group LLP

(57) ABSTRACT

A distributed station includes receiver circuitry which, in operation, receives information regarding wireless device switching from a terminal via a first wireless device, and controller circuitry which, in operation, determines, based on the information, switching from the first wireless device to a second wireless device and bandwidth part (BWP) aggregation in the second wireless device.

10 Claims, 26 Drawing Sheets

DISTRIBUTED STATION, AGGREGATION STATION, TERMINAL, AND COMMUNICATION METHOD

BACKGROUND

1. Technical Field

The present disclosure relates to a distributed station, an aggregation station, a terminal, and a communication method.

2. Background Art

In Release 15 of the 3rd Generation Partnership Project (3GPP) that is the International Organization for Standardization, introduction of a new interface (for example, New Radio (NR)) and a functional module is studied as an architecture of a radio access network (RAN) of a 5th generation (5G) mobile communication system.

For example, a configuration in which the functions of a 5G NR radio base station is separated (or split) is studied. The 5G NR radio base station configures a 5G radio access network (RAN), and is also referred to as a base station or a Next-Generation NodeB (gNB).

SUMMARY

However, a method with which a terminal performs bandwidth part (BWP) aggregation is not studied.

Non-limiting embodiments of the present disclosure contribute to providing a distributed station, an aggregation station, a terminal, and a communication method in which the terminal can perform BWP aggregation.

A distributed station according to an aspect of the present disclosure includes receiver circuitry which, in operation, receives information regarding wireless device switching from a terminal via a first wireless device, and controller circuitry which, in operation, determines, based on the information, switching from the first wireless device to a second wireless device and bandwidth part (BWP) aggregation in the second wireless device.

An aggregation station according to an aspect of the present disclosure includes receiver circuitry which, in operation, receives a setup request for BWP aggregation from a distributed station that controls a wireless device that wirelessly communicates with a terminal, and controller circuitry which, in operation, sets a terminal context and bearer regarding the BWP aggregation in response to the setup request.

A terminal according to an aspect of the present disclosure includes receiver circuitry which, in operation, receives, from a distributed station via a wireless device, instruction information instructing wireless device switching and BWP aggregation, and controller circuitry which, in operation, performs communication based on the BWP aggregation with a wireless device as a switching destination, based on the instruction information.

A communication method according to an aspect of the present disclosure is performed by a distributed station, and the communication method includes receiving information regarding wireless device switching from a terminal via a first wireless device, and determining, based on the information, switching from the first wireless device to a second wireless device and BWP aggregation in the second wireless device.

A communication method according to an aspect of the present disclosure is performed by an aggregation station, and the communication method includes receiving a setup request for BWP aggregation from a distributed station that controls a wireless device that wirelessly communicates with a terminal, and setting a terminal context and bearer regarding the BWP aggregation in response to the setup request.

A communication method according to an aspect of the present disclosure is performed by a terminal, and the communication method includes receiving, from a distributed station via the wireless device, instruction information instructing wireless device switching and BWP aggregation, and performing communication based on the BWP aggregation with a wireless device as a switching destination, based on the instruction information.

It should be noted that general or specific embodiments may be implemented as a system, a method, an integrated circuit, a computer program, a storage medium, or any selective combination thereof.

According to an aspect of the present disclosure, a terminal can perform BWP aggregation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION OF PREFERRED EMBODIMENTS

Hereinafter, exemplary embodiments of the present disclosure will be described in detail with reference to the drawings as appropriate. However, a more detailed description than necessary may be omitted. For example, the detailed description of already well-known matters and the overlapped description of a configuration substantially identical to the already-described one may be omitted. This is to prevent the following description from being unnecessarily redundant and to enable those skilled in the art to easily understand the present disclosure.

Note that the attached drawings and the following description are provided for those skilled in the art to fully understand the present disclosure, and are not intended to limit the subject matter described in the appended claims.

First Exemplary Embodiment

Figure 1:
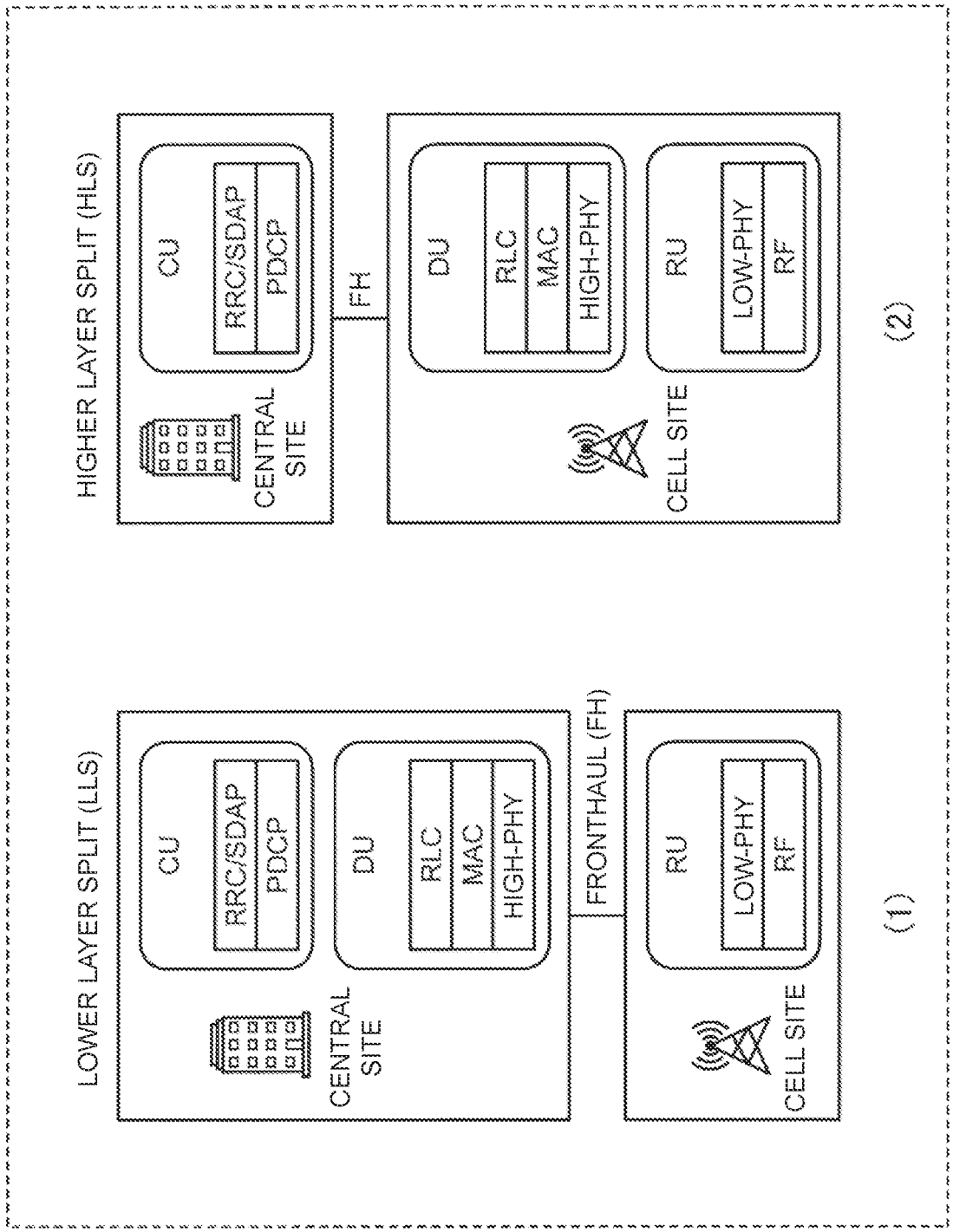
FIG. 1 is a diagram illustrating an arrangement example of functional modules of a base station.

FIG. 1 is a diagram illustrating an arrangement example of functional modules of a base station. In 3GPP Release 15, a new interface and functional module are introduced as a 5th generation radio access network (5G RAN) architecture. For example, a 5th-generation new radio (5G NR) base station referred to as a gNB may be configured by three functional modules: a centralized unit (CU); a distributed unit (DU); and a radio unit (RU).

The CU may be referred to as, for example, a centralized node, an aggregation node, a centralized station, an aggregation station, or a centralized unit. The DU may be referred to as, for example, a distributed node, a distributed station, or a distributed unit. The RU may be referred to as, for example, a wireless device, a radio node, a radio station, an antenna unit, or a radio unit.

A plurality of arrangement configurations is considered for the three functional modules. Two configurations called a lower layer split (LLS) and a higher layer split (HIS) have been studied depending on which of a cell site and a central site the three functional modules are arranged in.

For example, the module arrangement illustrated in part (1) of FIG. 1 is a configuration example of the LIS. In the LLS, the RU is disposed in the cell site, and the CU and DU are disposed in the central site.

The module arrangement illustrated in part (2) of FIG. 1 is a configuration example of the HIS. In the HLS, the DU and RU are disposed in the cell site, and the CU is disposed in the central site.

Note that the central site and the cell site are connected by an interface called a front haul (FH).

Figure 2:
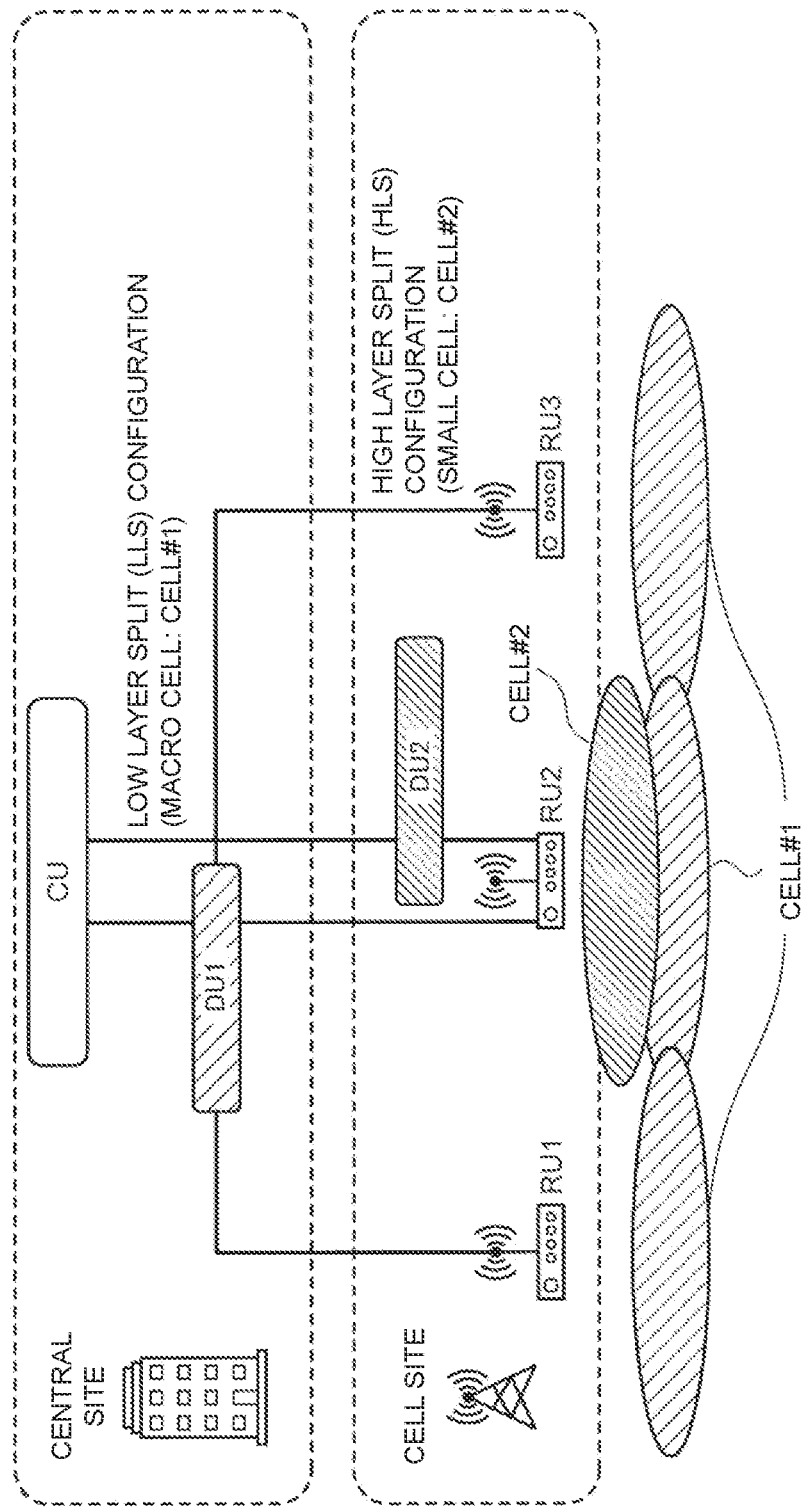
FIG. 2 is a diagram illustrating an example of a cell arrangement in a lower layer split (LLS) and a higher layer split (HLS)

FIG. 2 is a diagram illustrating an example of a cell arrangement in the LLS and HLS. In the LLS, for example, Cell #1 is formed by DU1 disposed in the central site and RU1 to RU3 disposed in the cell site. In the LLS, mobility control such as a handover can be reduced.

In the HLS, for example, DU2 is disposed in the cell site, and controls RU2 associated with DU2. In the HIS, Cell #2 smaller than Cell #1 formed in the LLS is formed. In the HLS, the disposing of DU2 in the cell site enables communication with a low delay.

Cell #1 may be referred to as a macro cell. Cell #2 may be referred to as a small cell. RU1 to RU3 may be referred to as distributed antennas because they are distributed in the LLS to form the macro cell. DU1 in the LLS may be referred to as an LLS DU. DU2 in the HLS may be referred to as an HIS DU.

For example, either of the LLS configuration and HLS configuration may be selected in response to a service request from a user. In addition, both the configurations may be shared and operated to respond to various service requests from users.

The FH or RU used in both the LLS and HLS configurations may be shared. For example, in the example of FIG. 2, RU2 is shared by the LLS and HLS. Therefore, FH resources and radio resources are coordinated in both the configurations.

Figure 3:
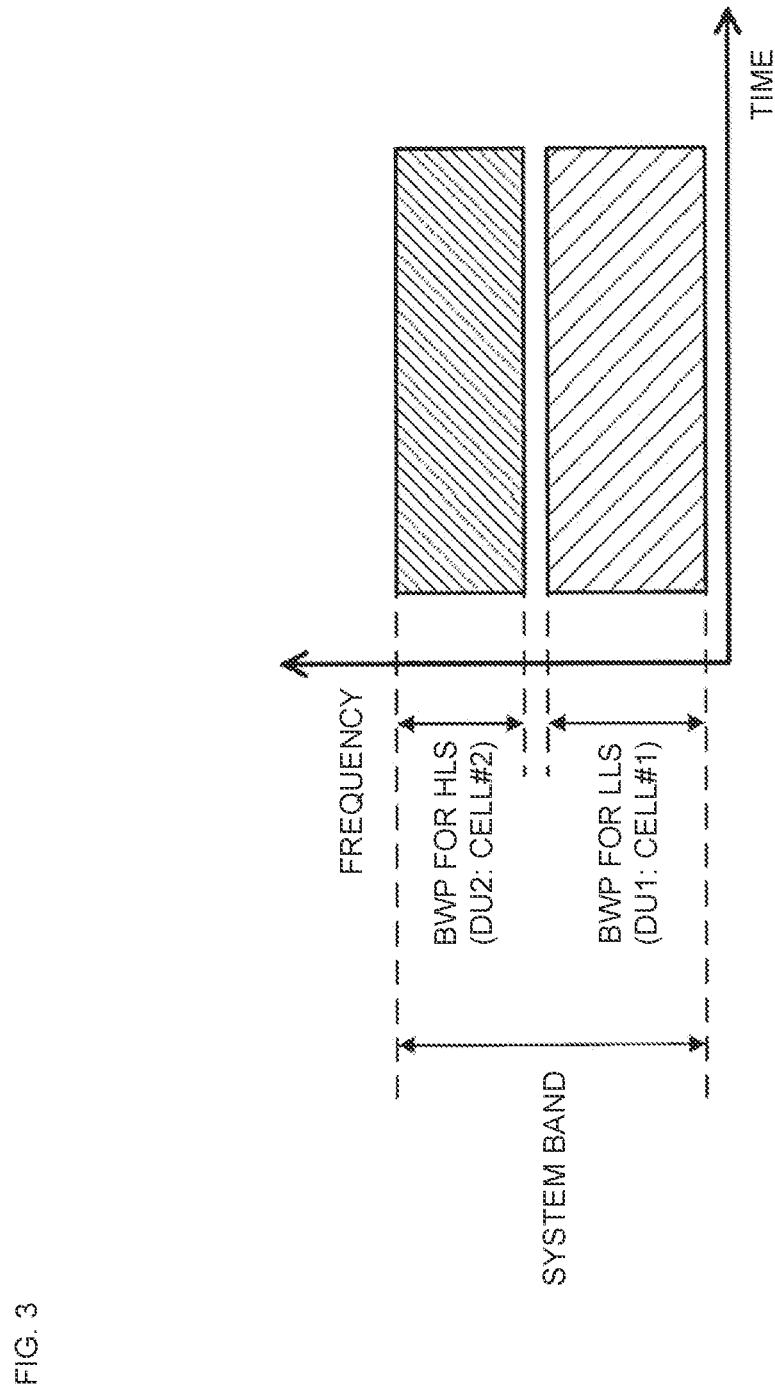
FIG. 3 is a diagram illustrating an example of radio resource allocation in a case where a plurality of distributed units (DUs) shares a radio unit (RU)

FIG. 3 is a diagram illustrating an example of radio resource (frequency) allocation in a case where a plurality of DUs shares an RU. The frequency allocation illustrated in FIG. 3 is, for example, an example of the frequency allocation in Cell #1 of RU2 illustrated in FIG. 2 (center Cell #1 among three Cells #1 illustrated in FIG. 2) and the frequency allocation in Cell #2 illustrated in FIG. 2.

DU1 as the LLS DU and DU2 as the HLS DU illustrated in FIG. 2 share RU2. Therefore, in RU2, a system bandwidth is divided by multiple bandwidth parts (BWPs) as illustrated in FIG. 3. For example, the system bandwidth is divided into a BWP used by DU1 as the LLS DU and a BWP used by DU2 as the HLS DU. The ratio of the respective BWPs may be dynamically changed in accordance with, for example, traffic conditions of DU1 and DU2.

On the other hand, in RU1 and RU3 occupied by one DU1, the system bandwidth may be occupied by one DU1.

Figure 4:
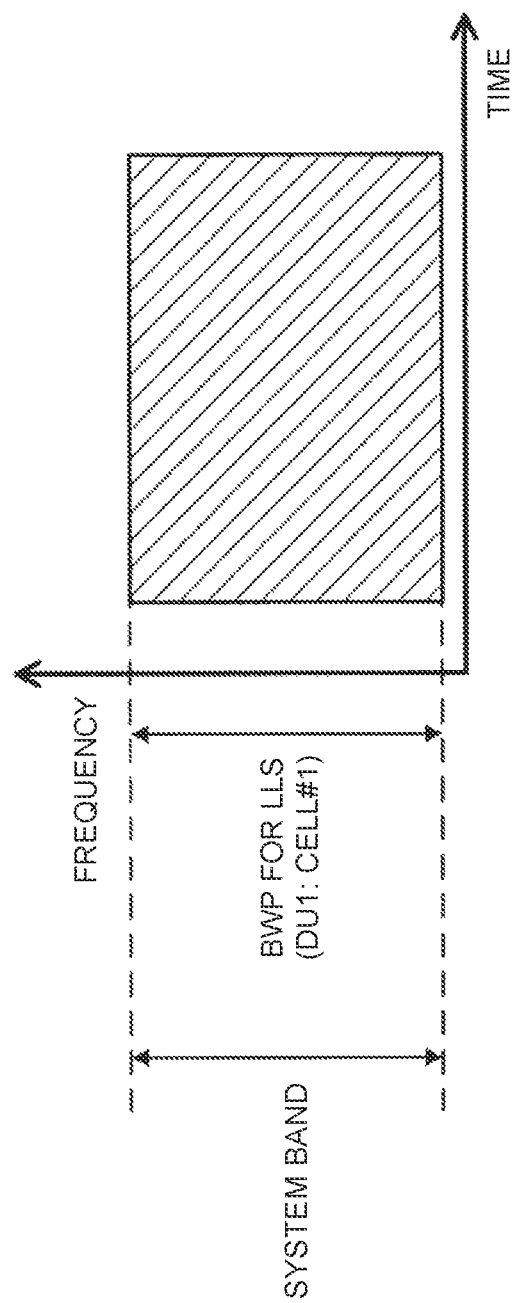
FIG. 4 is a diagram illustrating an example of radio resource allocation in a case where one DU occupies one RU.

FIG. 4 is a diagram illustrating an example of radio resource (frequency) allocation in a case where one DU occupies one RU. The frequency allocation illustrated in FIG. 4 is, for example, an example of the frequency allocation in Cells #1 of RU1 and RU3 illustrated in FIG. 2 (left and right Cells #1 excluding center Cell #1 among three Cells #1 illustrated in FIG. 2).

DU1 as the LLS DU illustrated in FIG. 2 occupies RU1 and RU3. Therefore, in RU1 and RU3, the system bandwidth is occupied by DU1 as illustrated in FIG. 4. For example, the system bandwidth may be occupied by a BWP used by DU1 as the LLS DU.

In the 3GPP specification, one terminal (UE) can use one active BWP. For example, the terminal uses one BWP of the two BWPs illustrated in FIG. 3. In other words, the terminal cannot simultaneously use the two BWPs illustrated in FIG. 3. Therefore, when using different BWPs, the terminal switches the BWPs.

Figure 5:
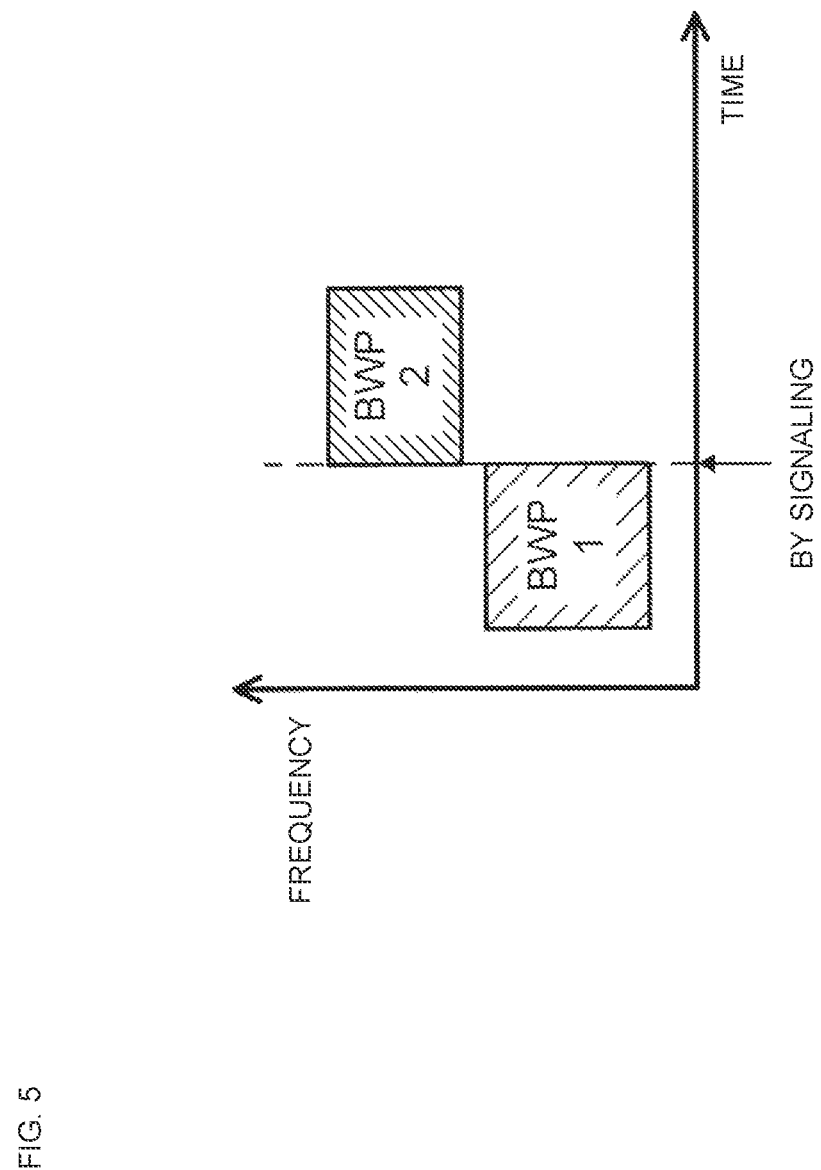
FIG. 5 is a diagram illustrating an example of a bandwidth part (BWP) switching.

FIG. 5 is a diagram illustrating an example of BWP switching. BWP1 illustrated in FIG. 5 corresponds to, for example, the BWP of the LLS illustrated in FIG. 3. BWP2 corresponds to, for example, the BWP of the HLS illustrated in FIG. 3.

As described above, in the 3GPP specification, one terminal can use one active BWP. Therefore, as illustrated in FIG. 5, the terminal performs switching between BWP1 and BWP2 to use multiple BWPs. The BWP switching uses, for example, signaling from the base station to the terminal in L1 (Physical Downlink Control Channel (PDCCH)), L2 (Medium Access Control Control Element (MAC CE)), or L3 (Radio Resource Control (RRC)).

Layer 1 is represented by L1. Physical Downlink Control Channel is represented by PDCCH. Layer 2 is represented by L2. Media Access Control Control Element is represented by MAC CE. Layer 3 is represented by L3. Radio Resource Control is represented by RRC.

One terminal can use one active BWP. Therefore, for example, when a plurality of DUs (for example, LLS DU and HLS DU) provide different services by using different BWPs, the terminal cannot simultaneously receive the different services in the plurality of DUs. Therefore, the first exemplary embodiment discloses an example in which the terminal makes a simultaneous multiple BWP connection (aggregation).

Figure 6:
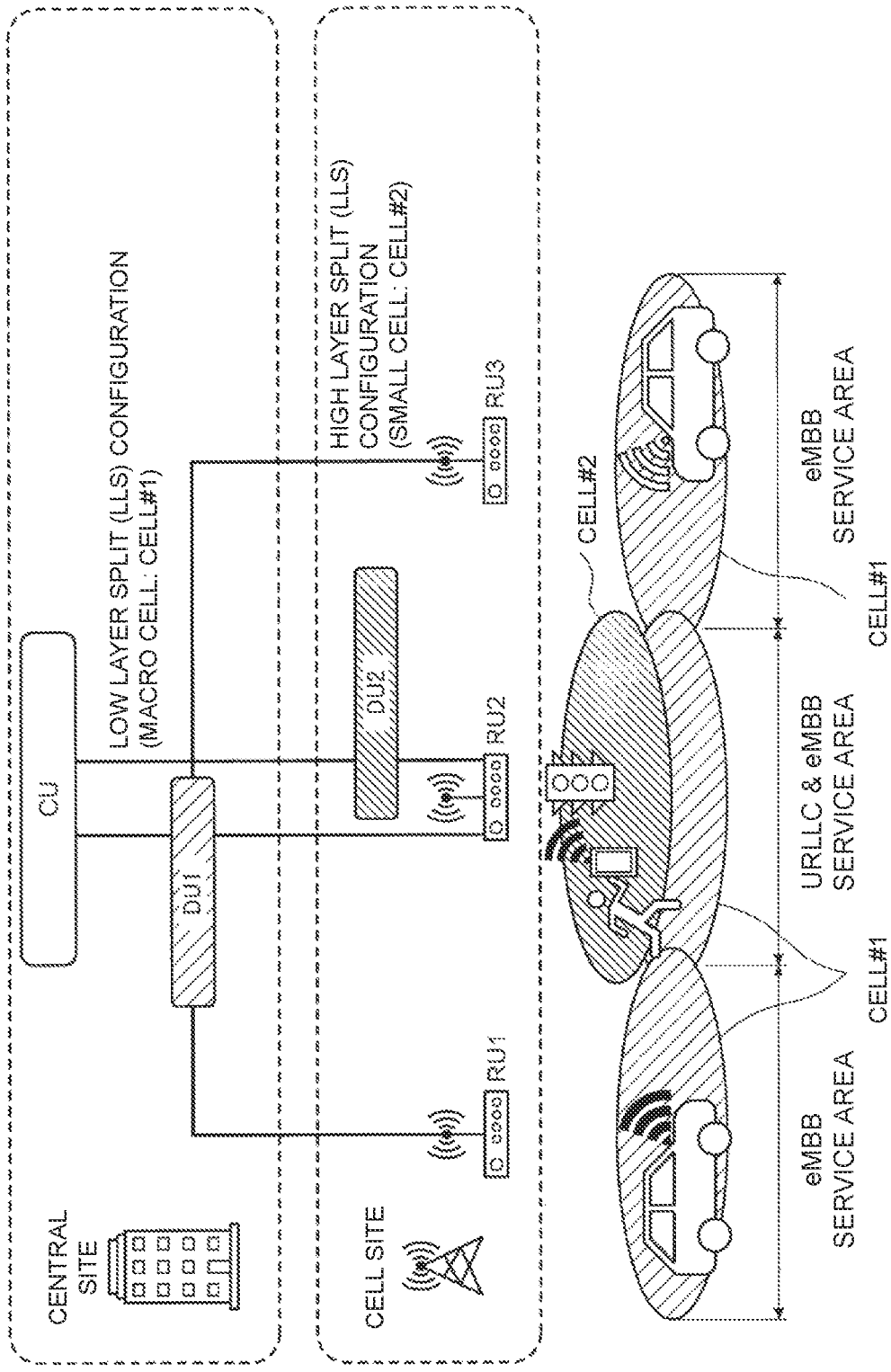
FIG. 6 is a diagram illustrating an example in which a terminal is connected to a plurality of DU services.

FIG. 6 is a diagram illustrating an example in which the terminal is connected to a plurality of DU services. In FIG. 6, the same components as those in FIG. 2 are denoted by the same reference numerals. RU2 illustrated in FIG. 6 may form, for example, Cell #1 (center Cell #1 among three Cells #1) and Cell #2 at an intersection.

DU1 as the LLS DU forming Cell #1 in a macro cell area provides, for example, a streaming service in enhanced mobile broadband (eMBB). DU2 as the HLS DU forming Cell #2 in a small cell area provides, for example, vehicle-to-everything (V2X) service such as provision of information about pedestrian at an intersection in Ultra-Reliable and Low Latency Communications (URLLC).

For example, the terminal such as an in-vehicle terminal of an automobile receives the eMBB service in the macro cell area. When entering (moving into) the small cell area (intersection area), the terminal receives the V2X service in addition to the eMBB service in the macro cell area. That is, when entering the intersection area, the terminal makes the multiple BWP connection and receives a plurality of services.

Note that, in Cell #2 of DU2 for which low-delay processing is required, the terminal is required to be connected early. In a case where the terminal makes multiple BWP connection after detecting HLS DU (DU2), which is a neighbor cell using radio resource management (RRM) measurement of the terminal, connection processing of the terminal is delayed.

In addition, the bandwidth of the BWP dynamically changes unlike a case where a plurality of component carriers (CCs) of a static bandwidth is connected, such as carrier aggregation (CA). Accordingly, the setup and connection sequence used in the carrier aggregation have difficulty in achieving the multiple BWP connection (BWP aggregation).

RU2 is shared by DU1 forming Cell #1 in the macro cell area and DU2 forming Cell #2 in the small cell area. For this reason, coverage of Cell #1 and coverage of Cell #2 formed by RU2 may be regarded as being substantially equivalent. Therefore, the terminal can start the multiple BWP connection in the RU switching in Cell #1 in the macro cell area.

For example, the terminal enters center Cell #1 from left Cell #1 among three Cells #1 illustrated in FIG. 6. In this case, the terminal connects with the BWP used by DU1 of the LLS and the BWP used by DU2 of the HIS at the time of switching from RU1 to RU2 in Cell #1.

The terminal identifies a plurality of RUs forming Cell #1 in the macro cell area, and performs RU switching in Cell #1. For example, the plurality of RUs forming Cell #1 transmits different beams. The terminal identifies the plurality of RUs based on the different beams in the plurality of RUs, and performs the RU switching in Cell #1 in the macro cell area.

Figure 7:
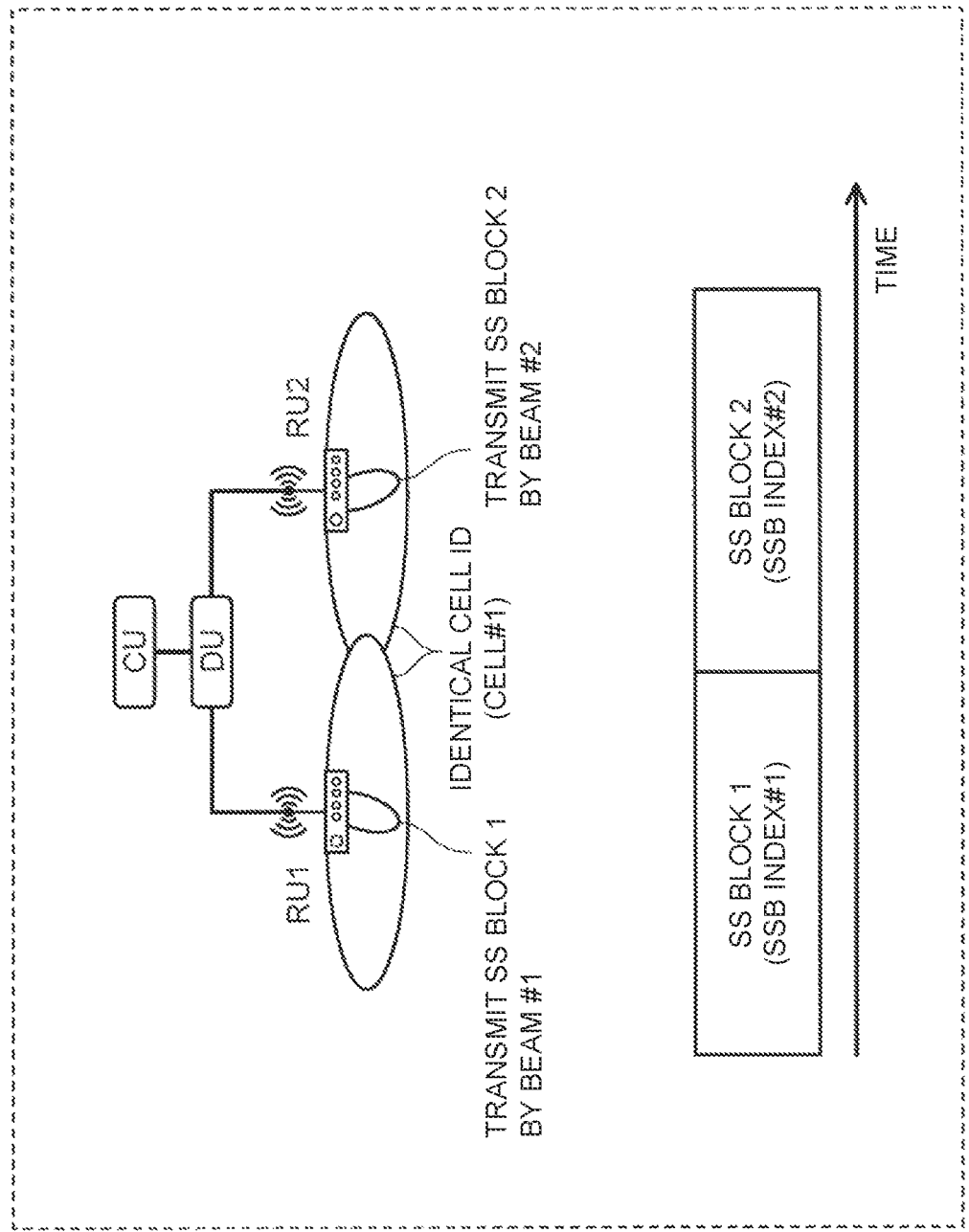
FIG. 7 is a diagram explaining an example of an RU switching operation of the terminal.

FIG. 7 is a diagram describing an example of an RU switching operation in the terminal. Synchronization signal blocks (SSBs) are represented by SS Block 1 and SS Block 2 illustrated in FIG. 7. SS Block 1 and SS Block 2 are sequentially transmitted by a plurality of Beam #1 and Beam #2 identified by SSB indexes.

When RU1 and RU2 sequentially transmit SS Block 1 and SS Block 2 using different Beam #1 and Beam #2, the terminal identifies the plurality of RU1 and RU2 forming Cells #1 in the macro cell area. The terminal performs switching between RU1 and RU2 based on reception quality of Beam #1 and Beam #2. When the multiple BWPs are provided in a switched RU, the terminal performs a multiple BWP connection.

Figure 8:
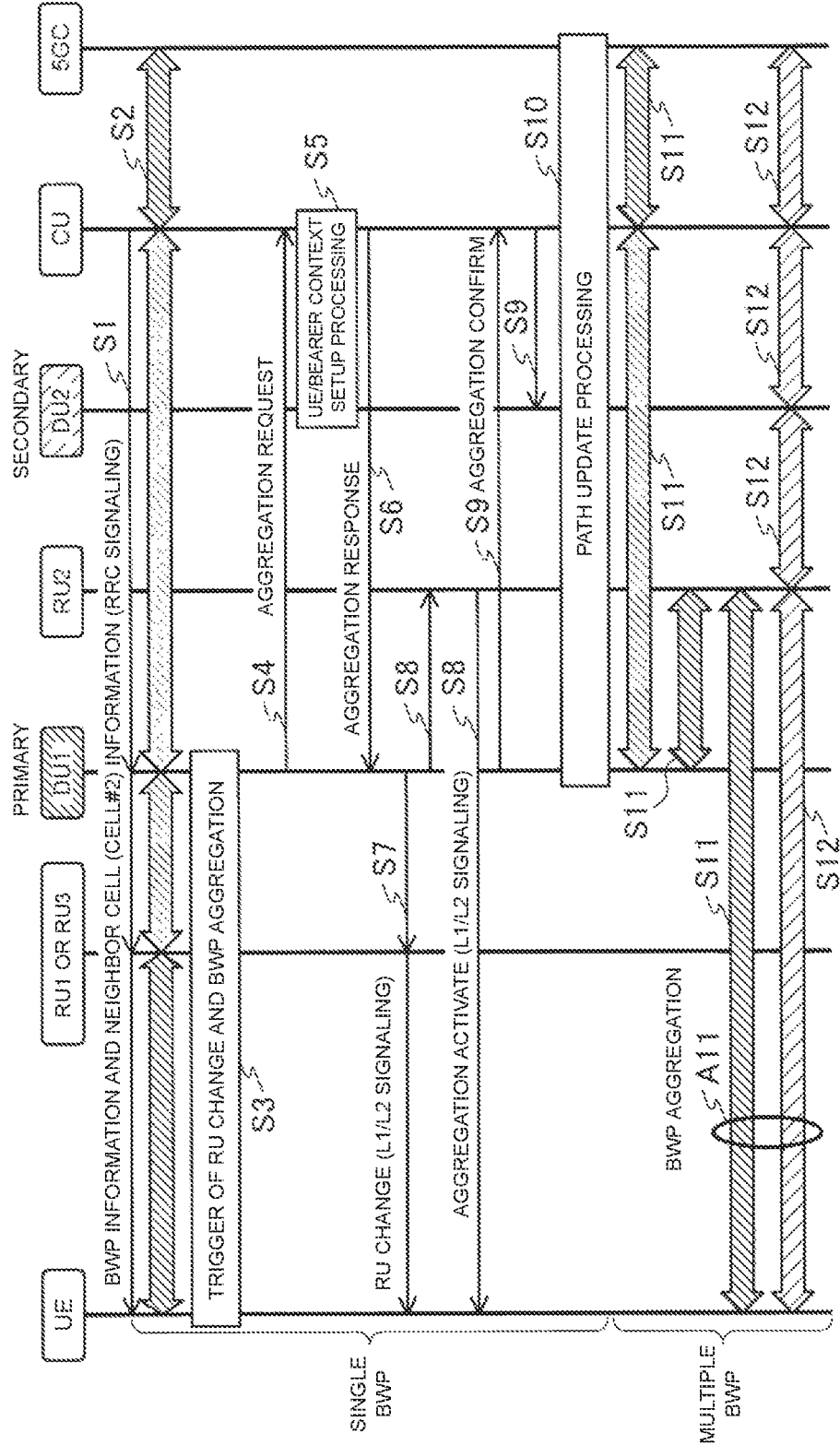
FIG. 8 is a diagram illustrating an example of a sequence of a wireless communication system according to a first exemplary embodiment.

FIG. 8 is a diagram illustrating an example of a sequence of a wireless communication system according to the first exemplary embodiment. The wireless communications system may instruct beam switching from the base station to the terminal, namely, RU switching by using, for example, L1 signaling or L2 signaling.

Hereinafter, DU1 forming Cell #1 in the macro cell area may be sometimes referred to as a primary DU. DU2 forming Cell #2 in the small cell area may be sometimes referred to as a secondary DU. DU2 as the secondary DU may be regarded as a DU that provides an additional BWP.

Before starting the multiple BWP connection, the terminal receives neighbor cell information (Cell #2) and simultaneously-connectable BWP information as an RRC message from the CU (S1).

The terminal communicates with a 5G core network (5GC) through RU1 (or RU3), DU1, and CU (S2). That is, the terminal is located in Cell #1 of RU1 (or Cell #1 of RU3) and communicates in a single BWP.

When the condition (described in another exemplary embodiment) for triggering the RU switching and the multiple BWP connection (BWP aggregation) is satisfied (S3), DU1 as the primary DU transmits an aggregation request to the CU to request the multiple BWP connection (S4).

In response to the aggregation request in S4, the CU transmits UE context information (for example, security-related information) and bearer information to the DU2 as the secondary DU, and sets the UE context and bearer (S5).

After completing the setup of the UE context and bearer, the CU transmits the aggregation response to DU1 as the primary DU to notify a response to the aggregation request (S6).

DU1 as the primary DU transmits an RU switching message (RU change) to the terminal through RU1 (or RU3), to which the terminal is currently connected, by using L1 signaling or L2 signaling (S7).

DU1 as the primary DU notifies the terminal about a message that instructs the multiple BWP connection (aggregation activate), through RU2 as a switched RU (Cell #1 in the macro cell area of RU2) using L1 signaling or L2 signaling (S8).

DU1 as the primary DU transmits a message "aggregation confirm" to the CU and DU2 as the secondary DU to notify about completion of a BWP aggregation setup (S9).

DU1 as the primary DU, DU2 as the secondary DU, and the 5GC execute path update processing (S10).

The terminal and the 5GC perform communication through RU2, DU1 as the primary DU, and the CU (S11). Further, the terminal and the 5GC perform communication via RU2, DU2 as the secondary DU, and the CU (S12). That is, the terminal communicates with the 5GC via DU1 forming the macro cell and DU2 forming the small cell.

That is, in a radio section between the terminal and RU2, the BWP provided by DU1 and the BWP provided by DU2 are aggregated as illustrated in frame A11 of FIG. 8. In this way, when the RU in the macro cell area is switched, the terminal can perform the multiple BWP connection, and can get a low-delay service of DU2 in the small cell area early.

Note that the RU switching message in S7 and the message instructing the multiple BWP connection in S8 may be transmitted together by one signaling. For example, the message in S8 may be transmitted by the signaling in S7.

Further, a control signal necessary for mobility control, such as handover, and uplink transmission power control of the terminal may be transmitted in the BWP provided by DU1 as the primary DU.

Further, the BWP controlled by DU1 as the primary DU may be referred to as a primary BWP. The BWP controlled by DU2 as the secondary DU may be referred to as a secondary BWP.

Further, Cell #1 formed by DU1 as the primary DU may be referred to as a primary cell. Cell #2 formed by DU2 as the secondary DU may be referred to as a secondary cell.

Figure 9:
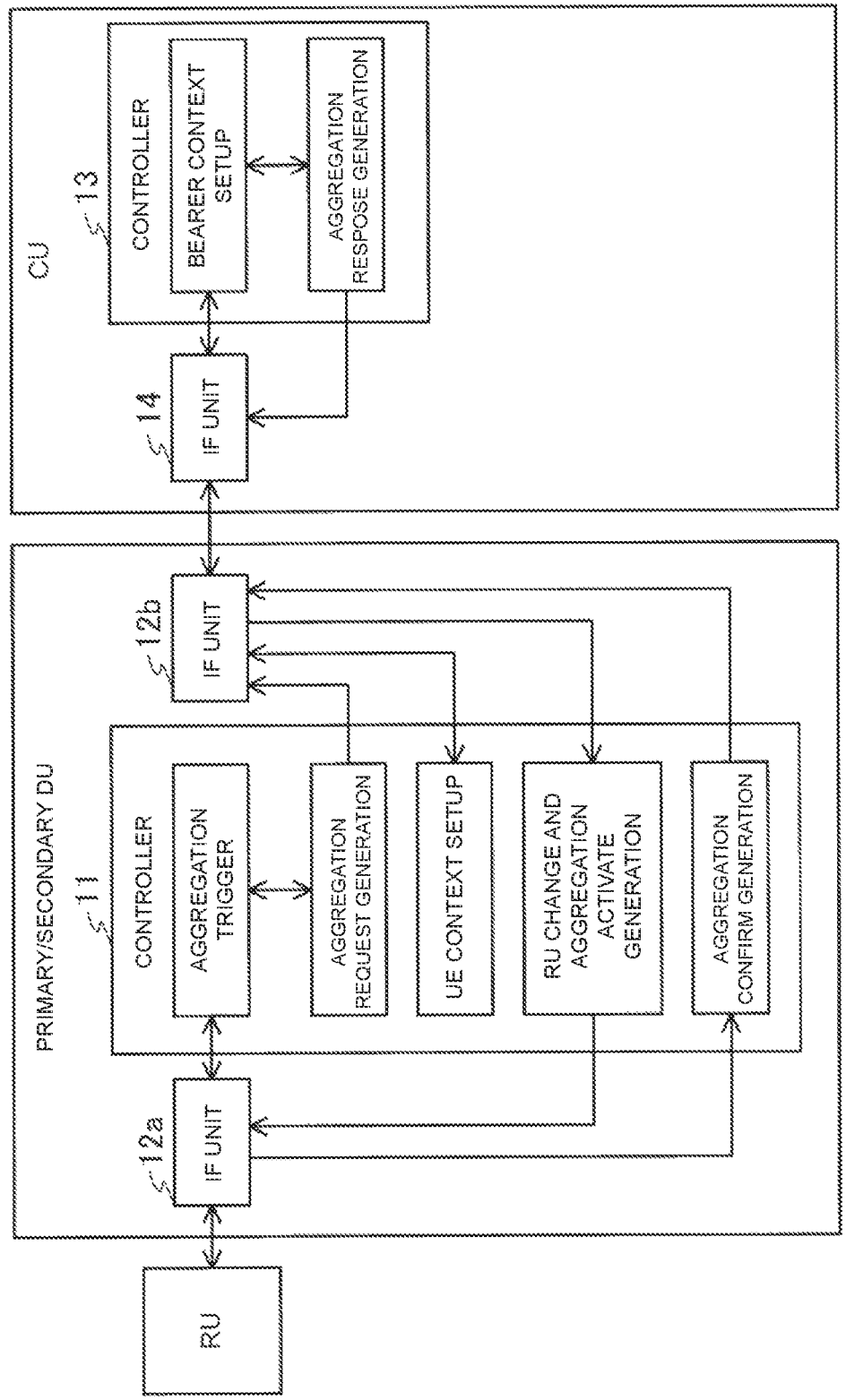
FIG. 9 is a block diagram illustrating a configuration example of the base station.

FIG. 9 is a block diagram illustrating a configuration example of the base station. As illustrated in FIG. 9, the base station includes a CU, a DU (primary/secondary DU), and an RU. The DU includes controller 11 and interface (IF) units 12a, 12b.

IF unit 12a communicates with the RU via, for example, an optical fiber. IF unit 12b communicates with the CU via, for example, an optical fiber. IF units 12a, 12b may be referred to as communication circuitries or communication units. The communication circuitry may include receiver circuitry and transmitter circuitry.

Controller 11 entirely controls the DU. Controller 11 may be configured by, for example, a processor such as a central processing unit (CPU) or a digital signal processor (DSP). Controller 11 may be referred to as controller circuitry. For example, controller 11 may execute a program stored in a storage device (not illustrated) and have the following functions.

Controller 11 determines whether the condition for triggering the RU switching and the multiple BWP connection is satisfied. When determining that the condition for triggering the RU switching and the multiple BWP connection is satisfied, controller 11 generates an aggregation request to transmit the aggregation request to the CU via IF unit 12b.

Controller 11 receives UE context information about a BWP to be added from the CU via IF unit 12b, and sets a UE context.

Controller 11 receives, from the CU via IF unit 12b, an aggregation response to the aggregation request to the CU. When receiving the aggregation response, controller 11 generates an RU change for switching the RU and transmits the RU change to the RU via IF unit 12a. Further, controller 11 generates the message "aggregation activate" instructing the multiple BWP connection and transmits the message "aggregation activate" to the RU via IF unit 12a.

After transmitting the message "aggregation activate", controller 11 generates the message "aggregation confirm" to transmit the message to the CU via IF unit 12b.

The CU includes controller 13 and IF unit 14. IF unit 14 communicates with the DU via, for example, an optical fiber. IF unit 14 may be referred to as communication circuitry or a communication unit. The communication circuitry may include receiver circuitry and transmitter circuitry.

Controller 13 entirely controls the CU. Controller 13 may be configured by, for example, a processor such as a CPU or a DSP. For example, controller 13 may execute a program stored in a storage device (not illustrated) and have the following functions.

Controller 13 receives an aggregation request from the CU via IF unit 14. When receiving the aggregation request, controller 13 sets a bearer context of a BWP to be added.

When setting the bearer context, controller 13 generates an aggregation response and transmits the aggregation response to the DU via IF unit 14.

Figure 10:
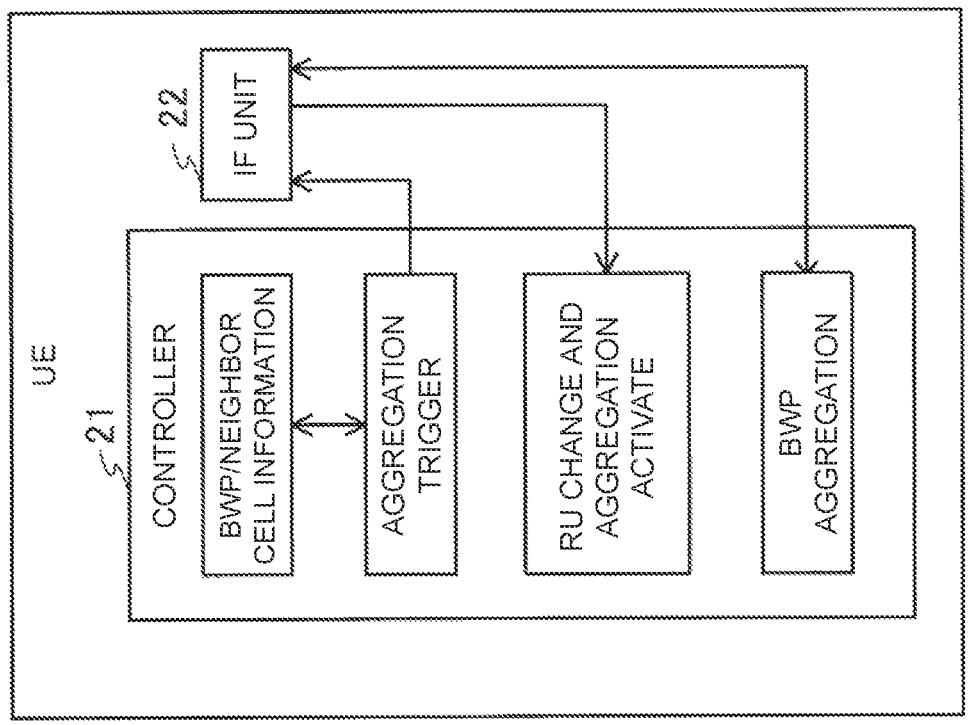
FIG. 10 is a block diagram illustrating a configuration example of the terminal.

FIG. 10 is a block diagram illustrating a configuration example of the terminal. As illustrated in FIG. 10, the UE includes controller 21 and IF unit 22.

IF unit 22 wirelessly communicates with the RU. IF unit 22 performs wireless communication using a single BWP or multiple BWPs under the control of controller 21. IF unit 22 may be referred to as communication circuitry or a communication unit. The communication circuitry may include receiver circuitry and transmitter circuitry.

Controller 21 entirely controls the UE. Controller 21 may be configured by a processor such as a CPU or a DSP. Controller 21 may be referred to as controller circuitry. For example, controller 21 may execute a program stored in a storage device (not illustrated) and have the following functions.

Controller 21 receives BWP information and neighbor cell information via IF unit 22 before starting the multiple BWP connection. Controller 21 transmits, to the base station, information (aggregation trigger) to be used when the base station determines a trigger condition.

Controller 21 receives a message "RU change" instructing RU switching via IF unit 22. Further, controller 21 receives the message "aggregation activate" instructing the multiple BWP connection via IF unit 22.

When receiving the message "RU change and aggregation activate", controller 21 controls IF unit 22, performs the RU switching, and performs the BWP aggregation communication. For example, controller 21 switches the RU forming the macro cell in response to the reception of the message "RU change", and makes a connection to the small cell provided by the switched RU in response to the reception of the message "aggregation activate". That is, controller 21 performs communication based on RU and BWP aggregation via IF unit 22.

As described above, when the trigger condition for triggering the RU switching and the multiple BWP connection is satisfied, DU1 performs the RU switching and the multiple BWP connection. As a result, the terminal can perform the BWP aggregation.

Second Exemplary Embodiment

In the first exemplary embodiment, the signaling of the RU switching and the multiple BWP connection is performed by the L1 signaling or the L2 signaling, but in a second exemplary embodiment, this signaling is performed by L3 signaling. This enables the RU switching in the macro cell area and the multiple BWP connection as in the first exemplary embodiment, and thus enables the terminal to receive the low-delay service of DU2 in the small cell area early.

Figure 11:
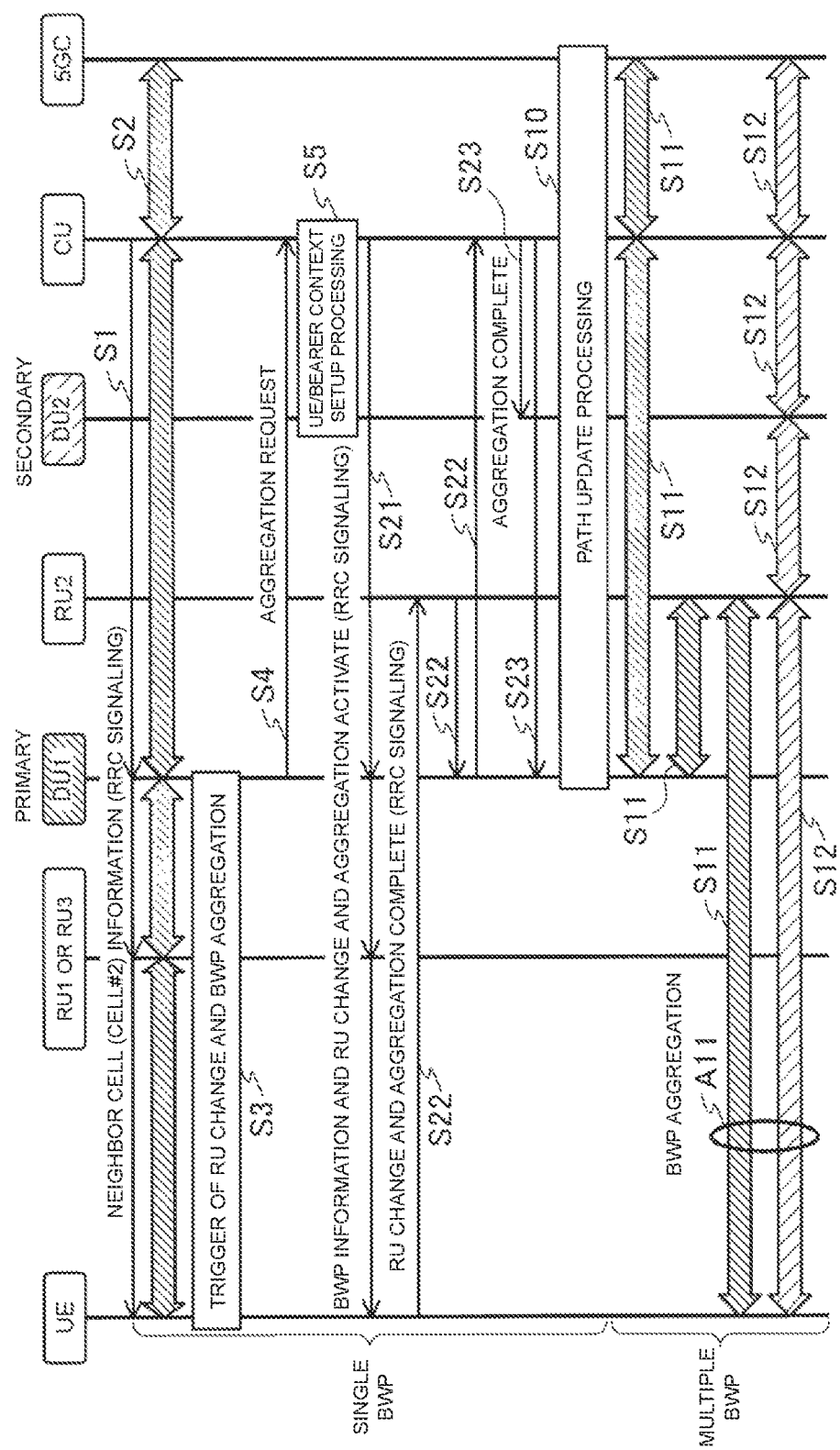
FIG. 11 is a diagram illustrating an example of a sequence of a wireless communication system according to a second exemplary embodiment.

FIG. 11 is a diagram illustrating an example of a sequence of a wireless communication system according to the second exemplary embodiment. In FIG. 11, the same processing steps as those in FIG. 8 are denoted by the same reference numerals.

Processing in S1 to S5 illustrated in FIG. 11 is similar to the processing in S1 to S5 described with reference to FIG. 8, and the description thereof will be omitted. However, in S1 of FIG. 11, the terminal receives neighbor cell information (Cell #2) and does not receive information about simultaneously connectable BWPs. In S21 described below, the terminal receives the information about the simultaneously connectable BWPs.

A CU notifies the terminal, using the L3 signaling, about the information about the simultaneously connectable BWPs, an RU switching message (RU change), and a message instructing the multiple BWP connection (aggregation activate) (S21).

When receiving the message "RU change" and the message "aggregation activate" in S21, the terminal performs RU switching processing and multiple BWP setup processing. When the setup processing is completed, the terminal notifies DU1 as a primary DU, via RU2 as a switched RU using the L3 signaling, about a message indicating that the setup processing is completed (RU change and aggregation complete) (S22). Further, DU1 as the primary DU notifies the CU, using the L3 signaling, about the message indicating that the setup processing is completed (RU change and aggregation complete) (S22).

When receiving the message "RU change and aggregation complete" in S22, the CU transmits the message "aggregation complete" to DU1 as the primary DU and DU2 as the secondary DU and notifies them about the completion of the BWP aggregation setup in the terminal (S23).

Processing in S10 to S12 illustrated in FIG. 11 is similar to the processing in S10 to S12 described with reference to FIG. 8, and the description thereof will be omitted.

Figure 12:
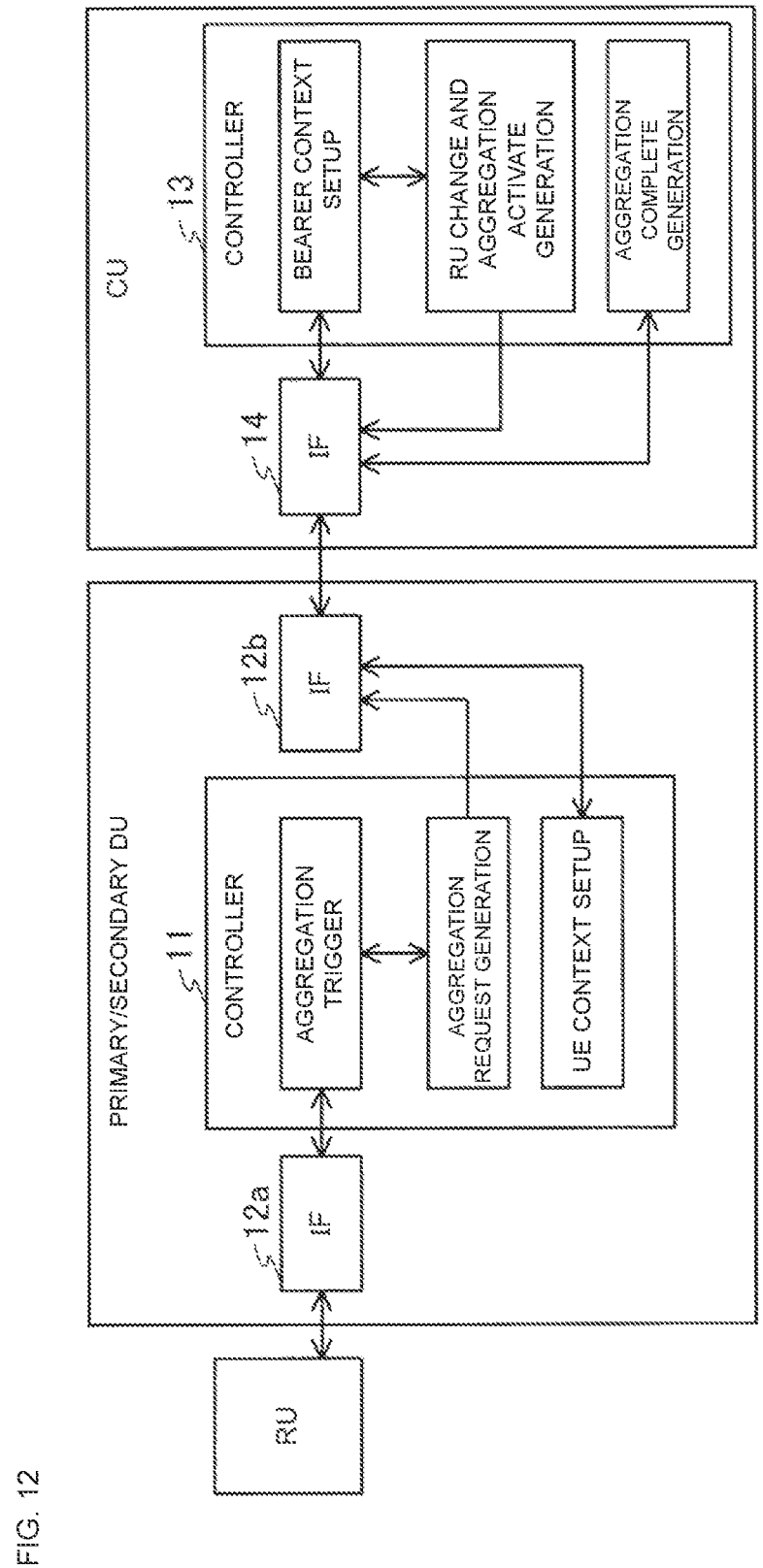
FIG. 12 is a block diagram illustrating a configuration example of a base station.

FIG. 12 is a block diagram illustrating a configuration example of a base station. In FIG. 12, the same components as those in FIG. 9 are denoted by the same reference numerals. In the block diagram of FIG. 12, the functions of controllers 11, 13 are different from the functions of controllers 11, 13 described with reference to FIG. 9.

As with controller 11 illustrated in FIG. 9, controller 11 in FIG. 12 has the functions of "AGGREGATION TRIGGER". "AGGREGATION REQUEST GENERATION", and "UE CONTEXT SETUP", but does not have the functions of "RU CHANGE AND AGGREGATION ACTIVATE GENERATION" and "AGGREGATION CONFIRM GENERATION" of controller 11 illustrated in FIG. 9.

Controller 13 in FIG. 12 has the function of "BEARER CONTEXT SETUP" as with controller 13 illustrated in FIG. 9. Controller 13 in FIG. 12 does not have the function of "AGGREGATION RESPONSE GENERATION" of controller 13 illustrated in FIG. 9, but has the functions of "RU CHANGE AND AGGREGATION ACTIVATE GENERATION" and "AGGREGATION COMPLETE".

Controller 13 notifies the terminal, using the L3 signaling, about a RU switching message (RU change) and a message instructing the multiple BWP connection (aggregation activate). Further, controller 13 transmits the message "aggregation complete" to the primary DU and the secondary DU.

The terminal has a configuration similar to the block configuration illustrated in FIG. 10. However, the function of controller 21 is partially different. Controller 21 receives, via IF unit 22 using the L3 signaling, the RU switching message and the message instructing the multiple BWP connection (RU change and aggregation activate). Further, when completing the RU switching processing and the multiple BWP setup processing, controller 21 transmits a message indicating that the setup processing is completed (RU change and aggregation complete) to the RU by using the L3 signaling.

As described above. DU1 may transmit signaling of the RU switching and the multiple BWP connection using the L3 signaling. This also enables the terminal to perform BWP aggregation. Using the L3 signaling with a larger amount of information than the L1 signaling and L2 signaling enables setup of bandwidth information of the BWPs in the L3 signaling, thus enabling flexible BWP change.

Third Exemplary Embodiment

In a third exemplary embodiment, a condition for triggering RU switching and a multiple BWP connection will be described.

A terminal measures channel state information (CSI) as reception quality of a beam of each RU forming Cell #1 in the macro cell area. The terminal notifies a primary DU about a CSI report of the measured CSI.

The primary DU compares the reception quality of the beam of each RU in Cell #1 based on the notified CSI report. When the reception quality of a switched RU is high, the primary DU performs the RU switching and the multiple BWP connection. The primary DU may use, for example, the following condition 1 as a trigger condition for the RU switching and the multiple BWP connection.

(Reception level of beam of RU2 in Cell #1)>(Reception level of beam of RU1 (or RU3) in Cell #1)      Condition 1

For example, in FIG. 6, the terminal measures the CSI of the beams of RU1, RU2, and RU3 forming Cell #1 in the macro cell area. The terminal notifies the primary DU about the CSI report. Note that the terminal may identify the beams of RU1, RU2, and RU3 forming Cell #1, for example, using the method described with reference to FIG. 7.

Here, it is assumed that the terminal enters an area of center Cell #1 from an area of left Cell #1 illustrated in FIG. 6. In this case, the reception level of the beam of RU2 as a switched RU in Cell #1 is higher than the reception level of the beam of RU1 as a switching source in Cell #1. Therefore, DU1 as the primary DU determines that the condition 1 is satisfied, and triggers the RU switching and the multiple BWP connection.

Note that condition 1 may be regarded as "a case where the receive level of a beam of a second RU in the macro cell area is higher than the receive level of a beam of a first RU, with which the terminal currently wirelessly communicates (connects), in the macro cell area". Here, the first RU and the second RU are RUs that forms the macro cell area. The second RU is the RU that forms the small cell area and provides the multiple BWPs. Further, the second RU is the RU shared by the DU of an LLS and the DU of an HLS.

Figure 13:
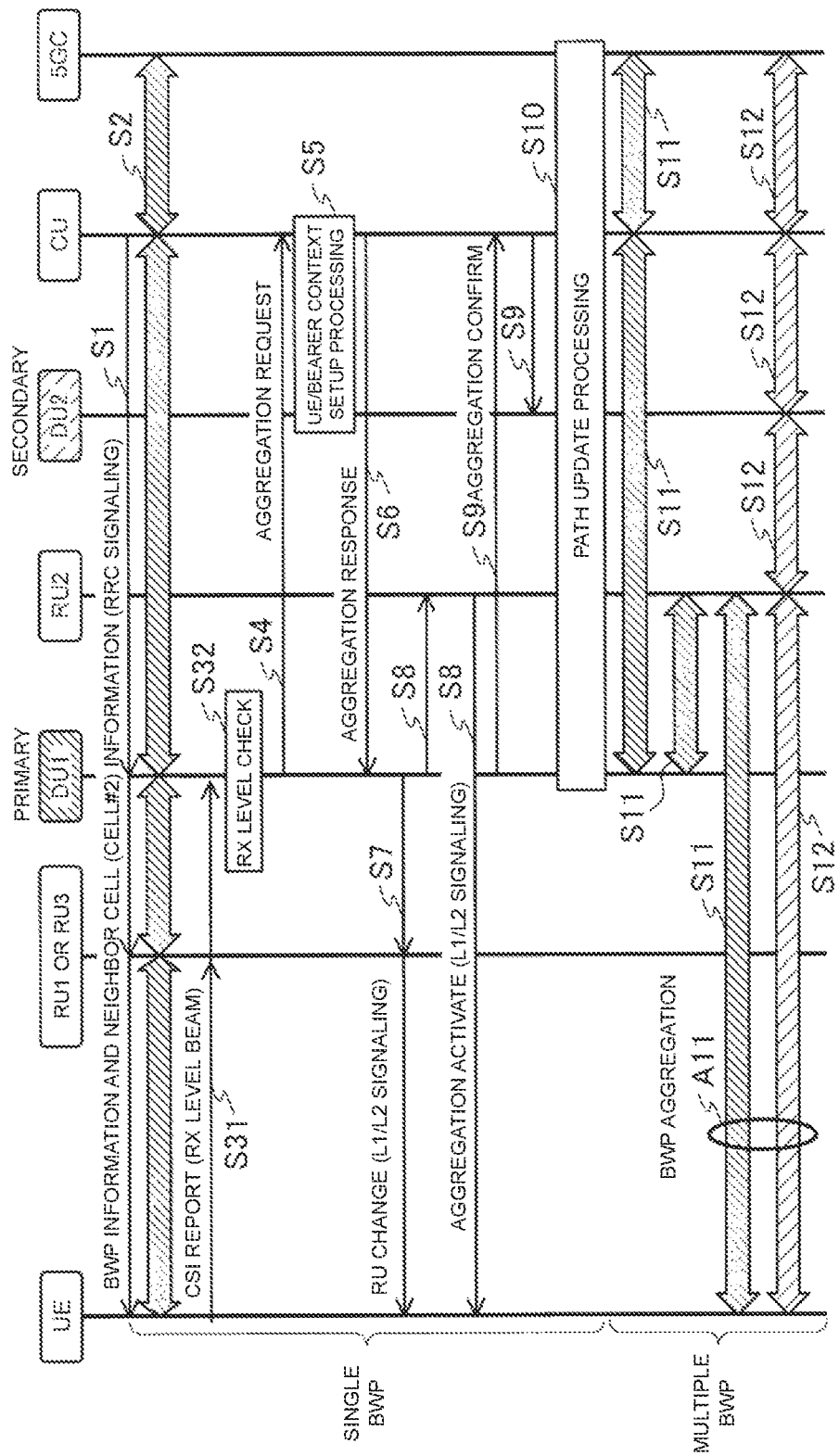
FIG. 13 is a diagram illustrating an example of a sequence of a wireless communication system according to a third exemplary embodiment.

FIG. 13 is a diagram illustrating an example of a sequence of a wireless communication system according to the third exemplary embodiment. In FIG. 13, the same processing steps as those in FIG. 8 are denoted by the same reference numerals.

Processing in S1 and S2 illustrated in FIG. 13 is similar to the processing in S1 and S2 described with reference to FIG. 8, and the description thereof will be omitted.

The terminal measures CSI of the beams of RU1, RU2, and RU3 in Cell #1 of the macro cell area, and notifies DU1 as the primary DU about a CSI report (S31).

DU1 as the primary DU determines whether the above-described condition 1 is satisfied, based on the notified CSI report (S32). When DU1 as the primary DU determines that the condition 1 is satisfied, based on the notified CSI report, the processing proceeds to S4. That is, DU1 starts multiple BWP connection processing.

Processing in S4 to S12 illustrated in FIG. 13 is similar to the processing in S4 to S12 described with reference to FIG. 8, and the description thereof will be omitted.

Figure 14:
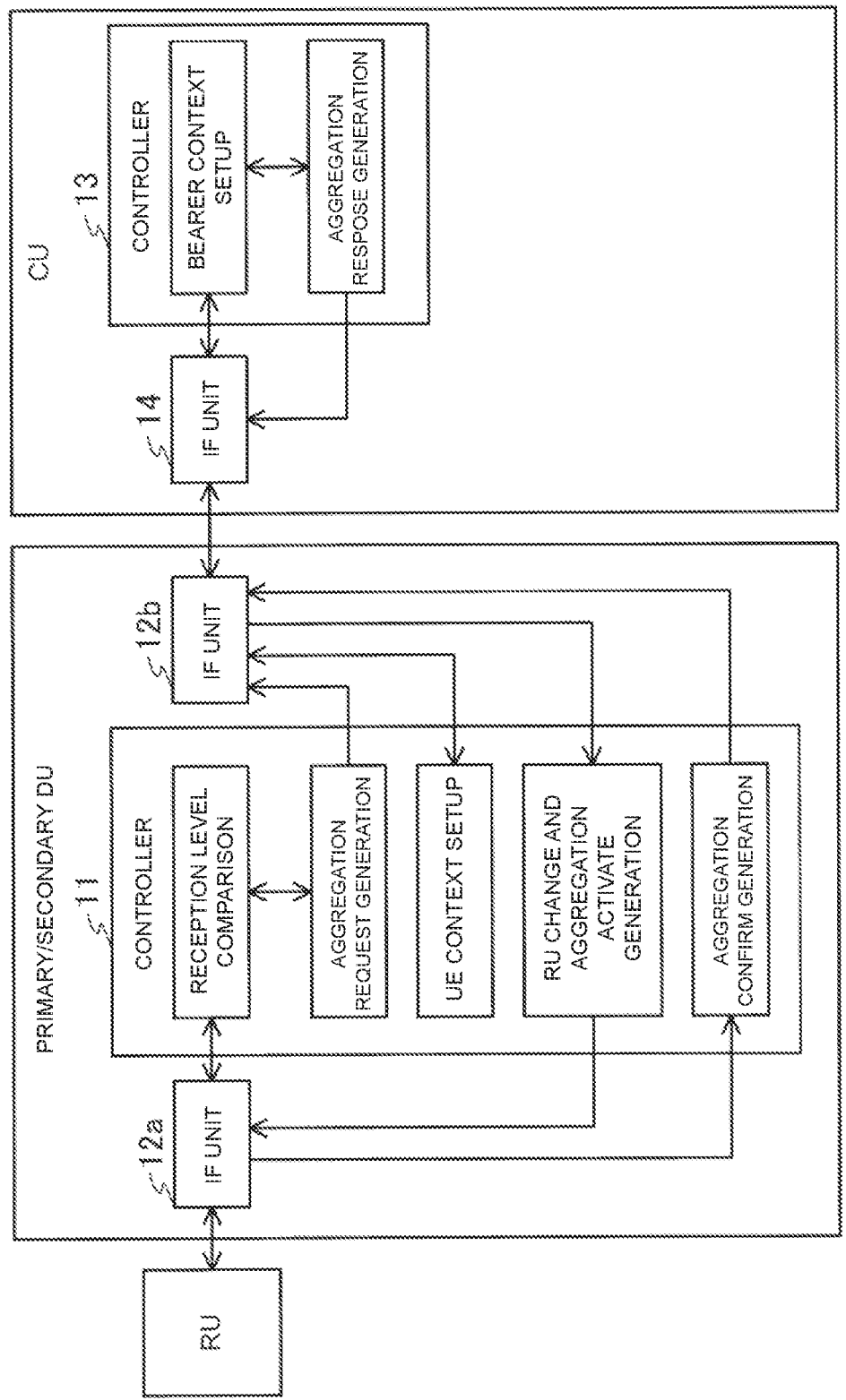
FIG. 14 is a block diagram illustrating a configuration example of a base station.

FIG. 14 is a block diagram illustrating a configuration example of a base station. In FIG. 14, the same components as those in FIG. 9 are denoted by the same reference numerals. In the block diagram of FIG. 14, the function of controller 11 is different from the function of controller 11 described with reference to FIG. 9. For example, "AGGREGATION TRIGGER" illustrated in FIG. 9 is replaced by "RECEPTION LEVEL COMPARISON" in the block of FIG. 14.

Controller 11 compares reception quality (for example, the reception level) of beams of the RUs based on the CSI report notified from the terminal, and determines whether a comparison result satisfies the condition 1. When the condition 1 is satisfied, controller 11 triggers the RU switching and the multiple BWP connection. Other functions of controller 11 are similar to the functions described with reference to FIG. 9, and the description thereof will be omitted.

The terminal has a configuration similar to the block configuration illustrated in FIG. 10. Note that controller 21 of the terminal according to the third exemplary embodiment transmits the CSI report to the base station as information to be used by the base station for determining the trigger condition.

As described above, DU1 receives the information (CSI report) about the RU switching from the terminal, and determines the RU switching and the multiple BWP connection based on the received information. As a result, the terminal can perform the BWP aggregation.

Note that when the reception quality in Cell #2 satisfies a prescribed condition, the terminal may notify the base station, through the measurement report, that the trigger condition for the RU switching and the multiple BWP connection is satisfied. The base station may trigger the RU switching and the multiple BWP connection through the measurement report from the terminal.

Fourth Exemplary Embodiment

In a fourth exemplary embodiment, the trigger condition described in the third exemplary embodiment includes terminal position information. This enables RU switching and a multiple BWP connection to be triggered with appropriate timing even when a difference in coverage arises between Cell #1 in a macro cell area and Cell #2 in a small cell area.

The terminal has, for example, a position acquisition function such as a global positioning system (GPS). The terminal acquires a position of the terminal using the position acquisition function, and notifies DU1 as a primary DU about information about the acquired position.

DU1 determines whether the terminal is located in a predetermined area (trigger area), based on the position information notified from the terminal. For example, when the terminal is located within a predetermined distance from Cell #2 in the small cell area, DU1 determines that the terminal is located in the trigger area.

Note that the trigger area may be smaller than or equal to the small cell area.

DU1 triggers the RU switching and the multiple BWP connection when the terminal is located in the trigger area and the condition 1 described in the third exemplary embodiment is satisfied.

Figure 15:
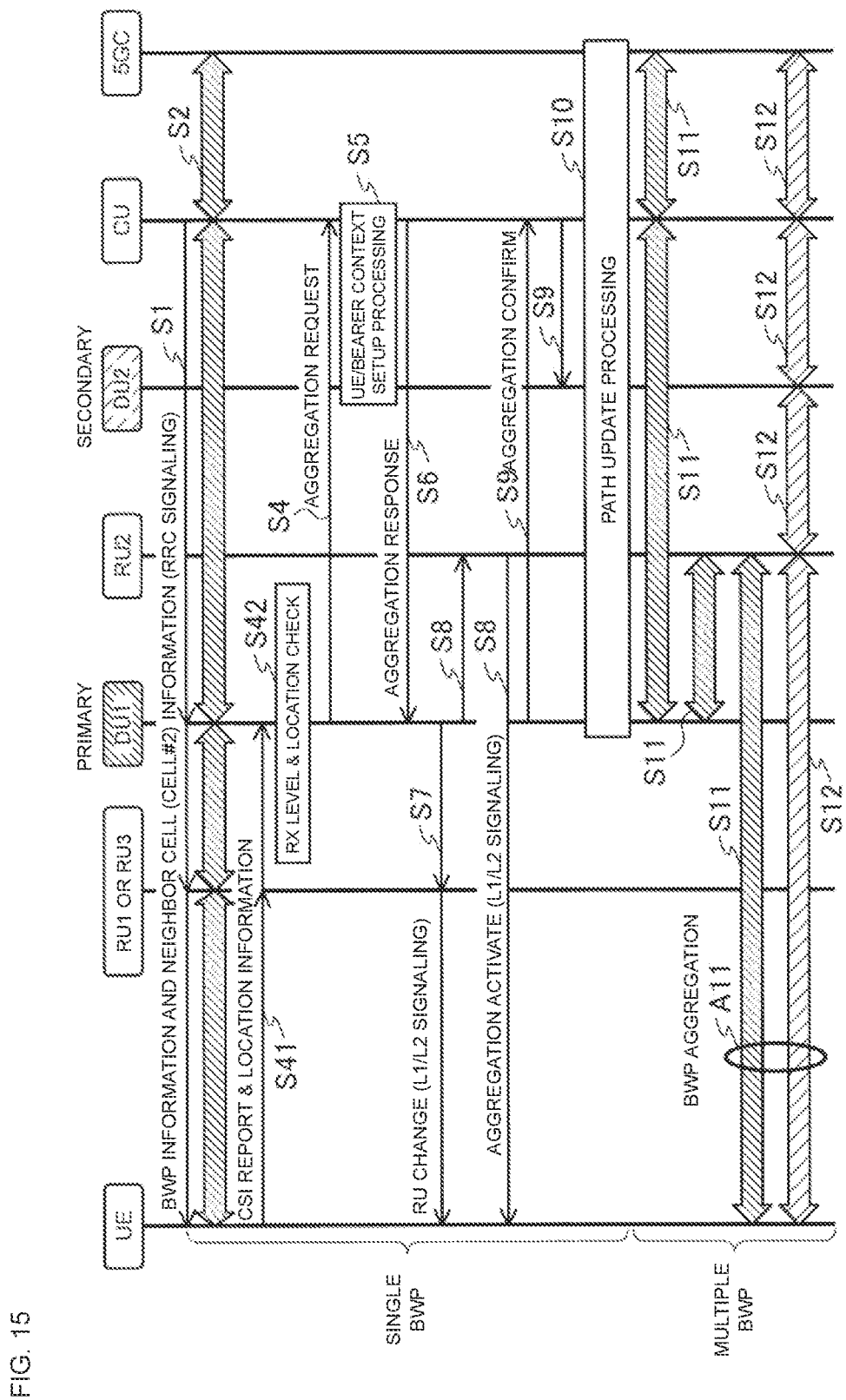
FIG. 15 is a diagram illustrating an example of a sequence of a wireless communication system according to a fourth exemplary embodiment.

FIG. 15 is a diagram illustrating an example of a sequence of a wireless communication system according to the fourth exemplary embodiment. In FIG. 15, the same processing steps as those in FIG. 8 are denoted by the same reference numerals.

The processing in S1 and S2 illustrated in FIG. 15 is similar to the processing in S1 and S2 described with reference to FIG. 8, and the description thereof will be omitted.

The terminal measures CSI of beams of RU1, RU2, and RU3 in Cell #1 in the macro cell area, and notifies DU1 as a primary DU about a CSI report (S41). Further, the terminal notifies DU1 as the primary DU about the terminal position information acquired by using the position acquisition function (S41).

DU1 as the primary DU determines whether the condition 1 described in the third exemplary embodiment is satisfied, based on the notified CSI report (S42). Further, DU1 as the primary DU determines whether the terminal is located in the trigger area, based on the notified terminal position information (S42). When DU1 as the primary DU determines that the condition 1 described in the third exemplary embodiment is satisfied and the terminal is located in the trigger area, the processing proceeds to S4. That is, DU1 starts multiple BWP connection processing.

The processing in S4 to S12 illustrated in FIG. 15 is similar to the processing in S4 to S12 described with reference to FIG. 8, and the description thereof will be omitted.

Figure 16:
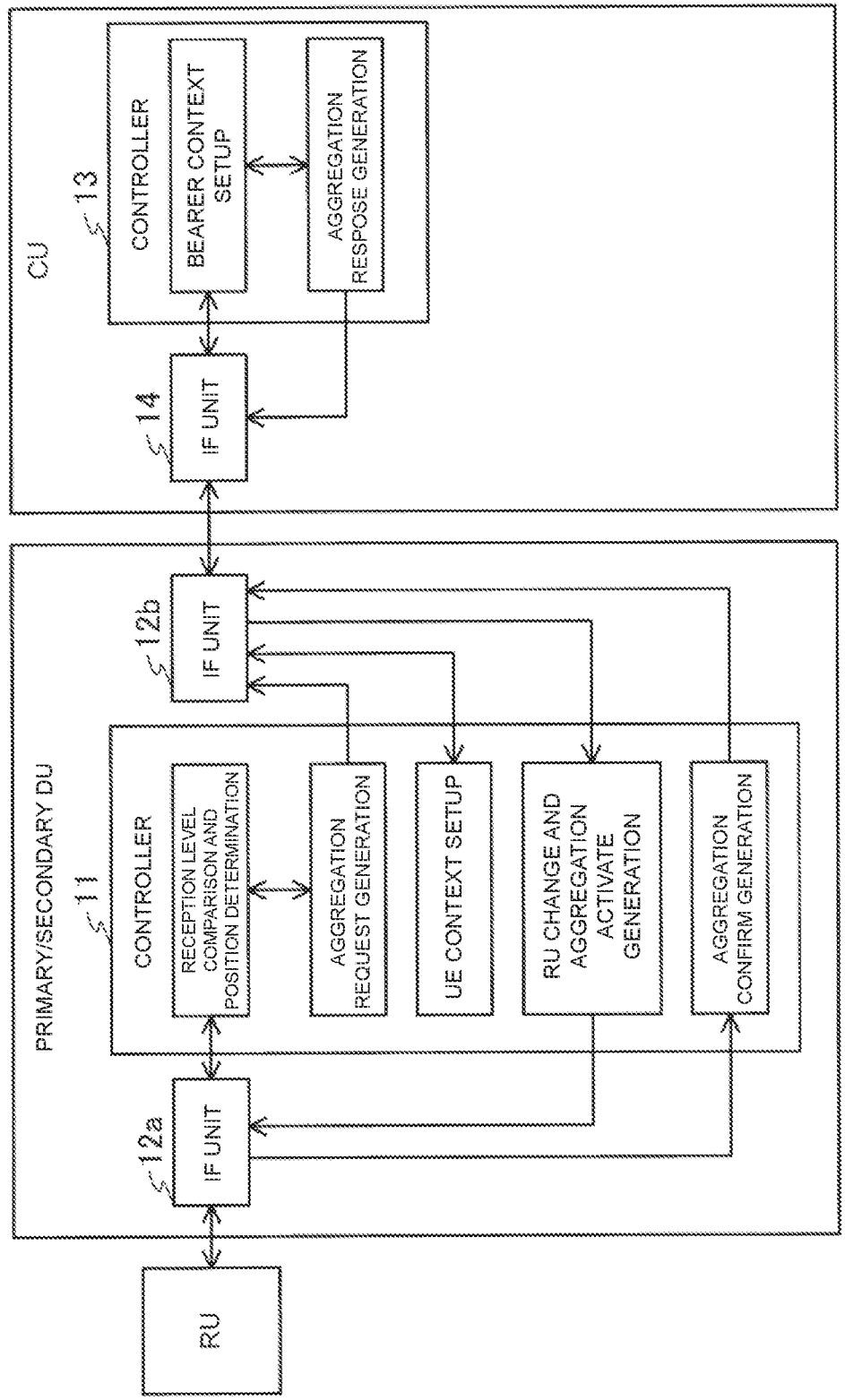
FIG. 16 is a block diagram illustrating a configuration example of a base station.

FIG. 16 is a block diagram illustrating a configuration example of a base station. In FIG. 16, the same components as those in FIG. 9 are denoted by the same reference numerals. In the block diagram of FIG. 16, the function of controller 11 is different from the function of controller 11 described with reference to FIG. 9. For example, "AGGREGATION TRIGGER" illustrated in FIG. 9 is replaced by "RECEPTION LEVEL COMPARISON AND POSITION DETERMINATION" in the block of FIG. 16.

Controller 11 compares reception quality (for example, reception level) of the beams of the respective RUs based on the CSI report notified from the terminal, and determines whether the comparison result satisfies the condition 1.

Further, controller 11 determines whether the terminal is located in the trigger area, based on the terminal position information notified from the terminal.

When the condition 1 is satisfied and the terminal is located in the trigger area, controller 11 triggers the RU switching and the multiple BWP connection. Other functions of controller 11 are similar to the functions described with reference to FIG. 9, and the description thereof will be omitted.

The terminal has a configuration similar to the block configuration illustrated in FIG. 10. However, the terminal has the position acquisition function such as the GPS. Controller 21 of the terminal according to the third exemplary embodiment transmits the CSI report and the terminal position information to the base station as information to be used by the base station to determine the trigger condition.

As described above. DU1 determines the RU switching and the multiple BWP connection based on the terminal position information in addition to the CSI report. This enables the terminal to trigger the RU switching and the multiple BWP connection with appropriate timing even when a difference in coverage arises between Cell #1 in the macro cell area and Cell #2 in the small cell area transmitted by RU2.

Note that, in the above description, DU1 as the primary DU triggers the RU switching and the multiple BWP connection when the condition 1 is satisfied and the terminal is located in the trigger area, but the present invention is not limited thereto. DU1 might not use the condition 1 as the trigger condition. That is, DU1 may trigger the RU switching and the multiple BWP connection when the terminal is located in the trigger area.

Fifth Exemplary Embodiment

In a fifth exemplary embodiment, CSI in a subband unit of the terminal is used to trigger RU switching and a multiple BWP connection.

Figure 17A:
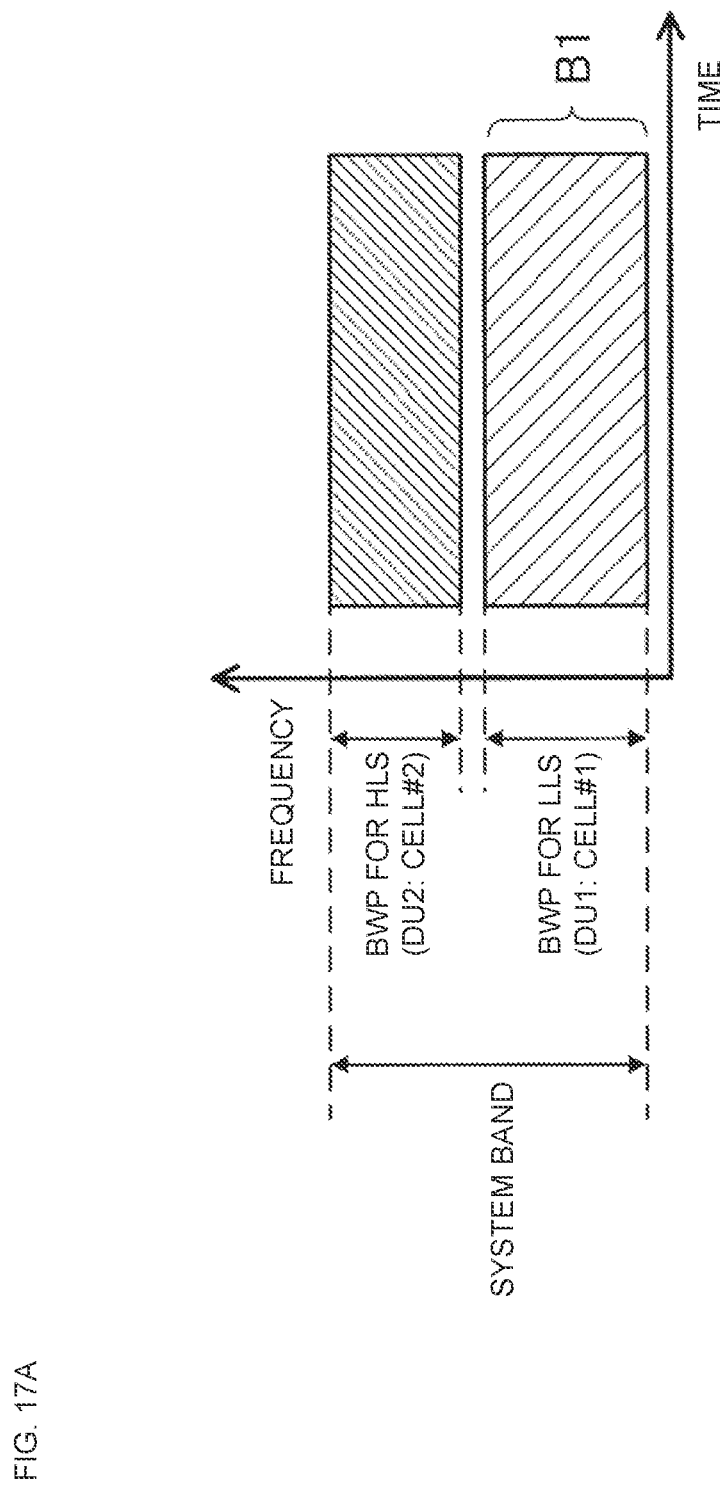
FIG. 17A is a diagram illustrating an example of radio resource allocation.
Figure 17B:
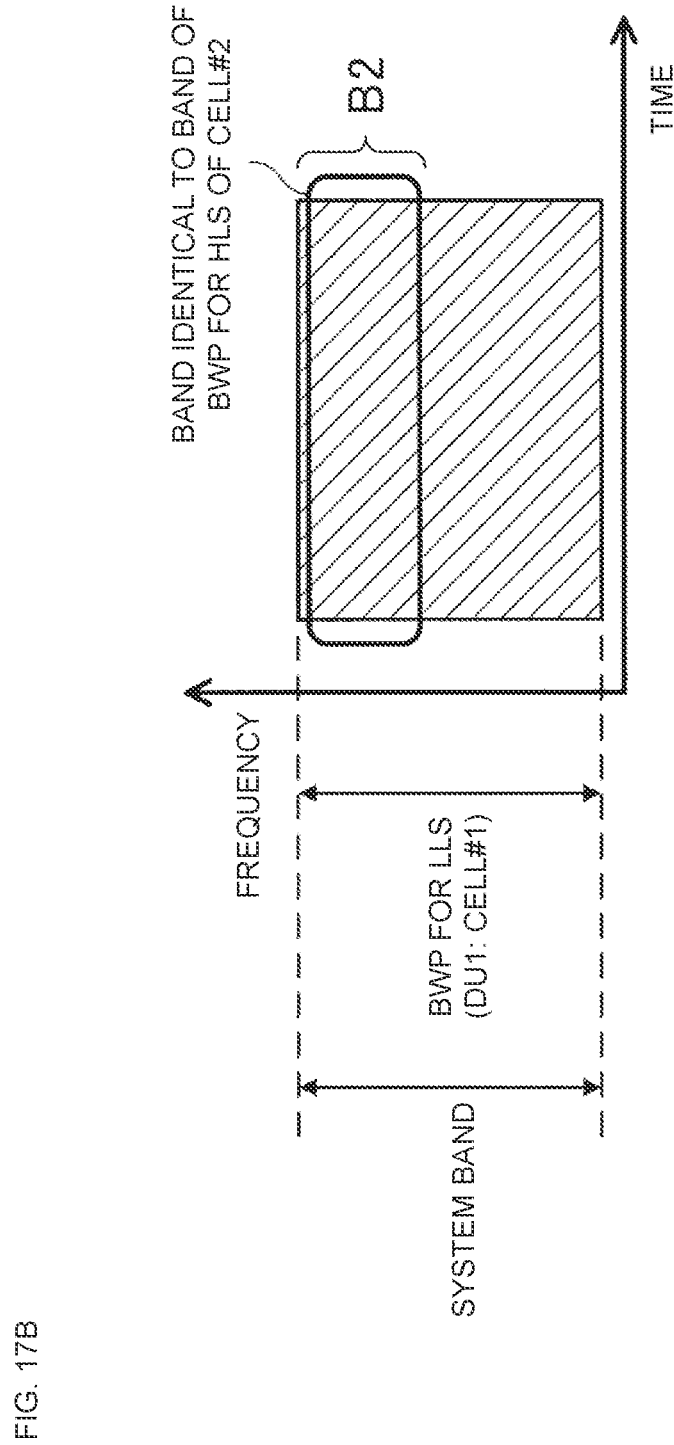
FIG. 17B is a diagram illustrating an example of radio resource allocation.

FIGS. 17A and 17B are diagrams illustrating examples of radio resource (frequency) allocation. FIG. 17A illustrates frequency allocation of RU2 shared by DU1 as a primary DU and DU2 as a secondary DU. FIG. 17B illustrates frequency allocation of RU1 (or RU3) occupied by DU1 (or DU3) as the primary DU.

DU1 as the primary DU acquires a reception level of a beam of RU2 shared with the secondary DU in Cell #1, based on a notified CSI report. For example, DU1 as the primary DU acquires the reception level for a bandwidth B1 illustrated in FIG. 17A.

Further, DU1 as the primary DU acquires a reception level for a bandwidth corresponding to Cell #2 from Cell #1 of RU1 (or RU3) occupied by DU1 as the primary DU, based on the notified CSI report. That is, DU1 as the primary DU acquires a reception level, which is calculated from CSI for each subband, for the bandwidth corresponding to Cell #2 in the small cell area. For example, DU1 as the primary DU acquires a reception level for a bandwidth B2 illustrated in FIG. 17B. The bandwidth B2 corresponds to the bandwidth of Cell #2 in the small cell area.

DU1 as the primary DU may use, for example, the following condition 2 and condition 3 as trigger conditions for the RU switching and the multiple BWP connection.

(Reception level of beam of RU2 in Cell
1)>Threshold X        Condition 2

(Reception level of RU1 [or RU3] that is calculated
from the subband CSI and for the same bandwidth as of Cell #2<Threshold Y        Condition 3

Note that the reception level of a beam on a left side of the condition 2 corresponds to, for example, a reception level for bandwidth B1 illustrated in FIG. 17A. The reception level of a beam on a left side of the condition 3 corresponds to, for example, the reception level for the bandwidth B2 illustrated in FIG. 17B.

For example, in FIG. 6, the terminal measures CSI of beams of RU1, RU2, and RU3 forming Cell #1 in the macro cell area for each subband. The terminal notifies a primary DU about a CSI report of the measured CSI. Note that the terminal may identify the beams of RU1, RU2, and RU3 forming Cell #1, for example, using the method described with reference to FIG. 7.

Here, it is assumed that the terminal enters an area of center Cell #1 from an area of left Cell #1 illustrated in FIG. 6. In this case, the reception level of the beam of RU2 as a switched RU in Cell #1 is higher than the threshold X. Further, the reception level of RU1 that is calculated from the subband CSI and is for the same bandwidth as of Cell #2 becomes lower than the threshold Y due to an interference of Cell #2. Therefore, DU1 as the primary DU determines that the condition 2 and condition 3 are satisfied, and triggers the RU switching and the multiple BWP connection.

The condition 2 may be regarded as a "case where a reception level of a beam of an RU providing multiple BWPs in the macro cell area is higher than a threshold X". Here, the RU providing the multiple BWPs is a switched RU that is switched by the terminal.

Further, the condition 3 may be regarded as a "case where a reception level of a beam of an RU with which the terminal currently wirelessly communicates (connects), namely, a reception level for the bandwidth (B2) corresponding to the bandwidth of the small cell is lower than the threshold Y". Here, the RU with which the terminal currently wirelessly communicates is an RU before switching by the terminal, and is an RU that forms the macro cell area.

Figure 18:
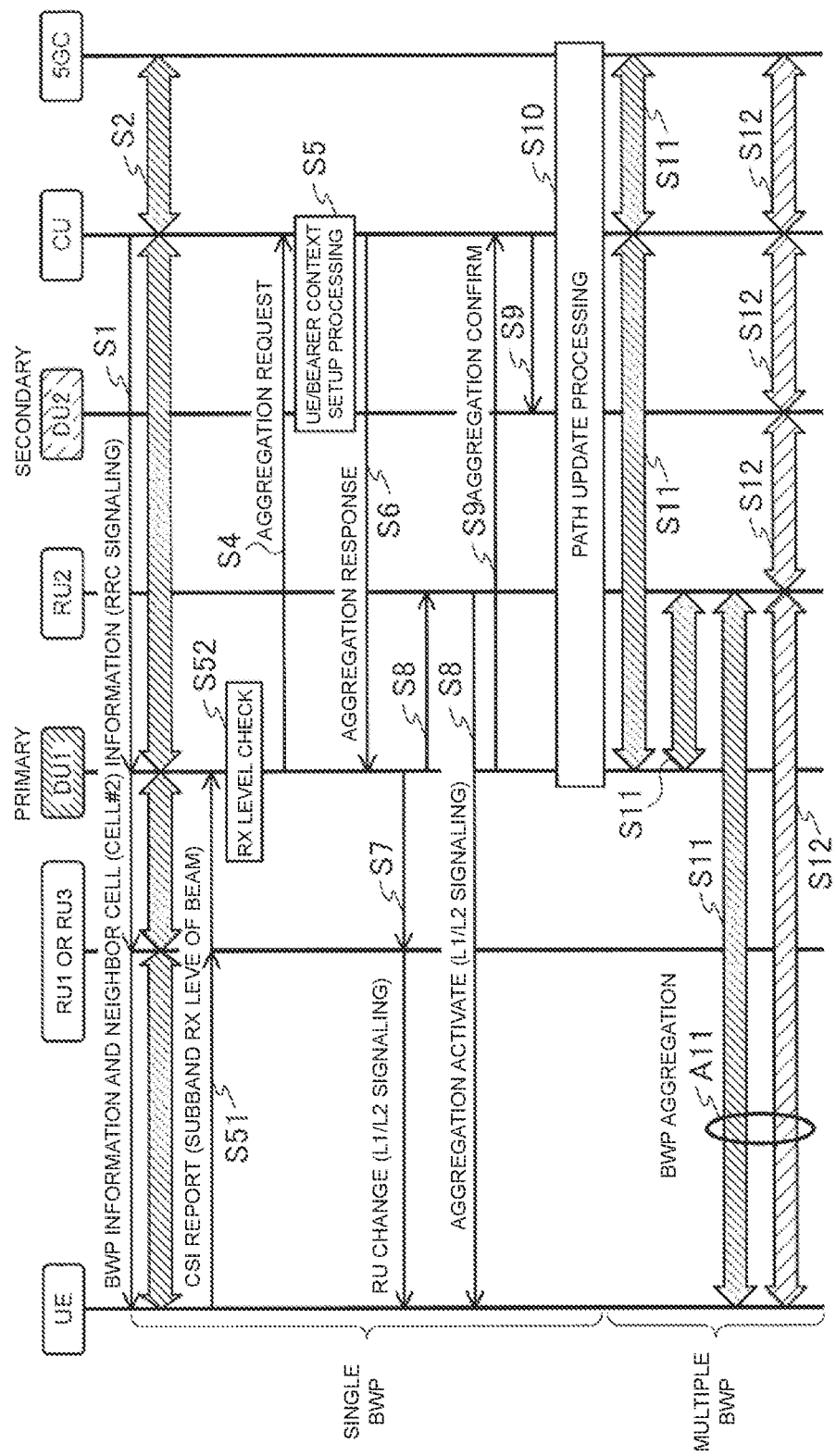
FIG. 18 is a diagram illustrating an example of a sequence of a wireless communication system according to a fifth exemplary embodiment.

FIG. 18 is a diagram illustrating an example of a sequence of a wireless communication system according to the fifth exemplary embodiment. In FIG. 18, the same processing steps as those in FIG. 8 are denoted by the same reference numerals.

The processing in S1 and S2 illustrated in FIG. 18 is similar to the processing in S1 and S2 described with reference to FIG. 8, and the description thereof will be omitted.

The terminal measures CSI of beams of RU1, RU2, and RU3 forming Cell #1 in the macro cell area for each subband, and notifies DU1 as the primary DU about a CSI report (S51).

DU1 as the primary DU determines whether the above-described condition 2 and condition 3 are satisfied, based on the notified CSI report (S52). When DU1 as the primary DU determines that the condition 2 and condition 3 are satisfied, based on the notified CSI report, the processing proceeds to S4. That is, DU1 starts multiple BWP connection processing.

The processing in S4 to S12 illustrated in FIG. 18 is similar to the processing in S4 to S12 described with reference to FIG. 8, and the description thereof will be omitted.

Figure 19:
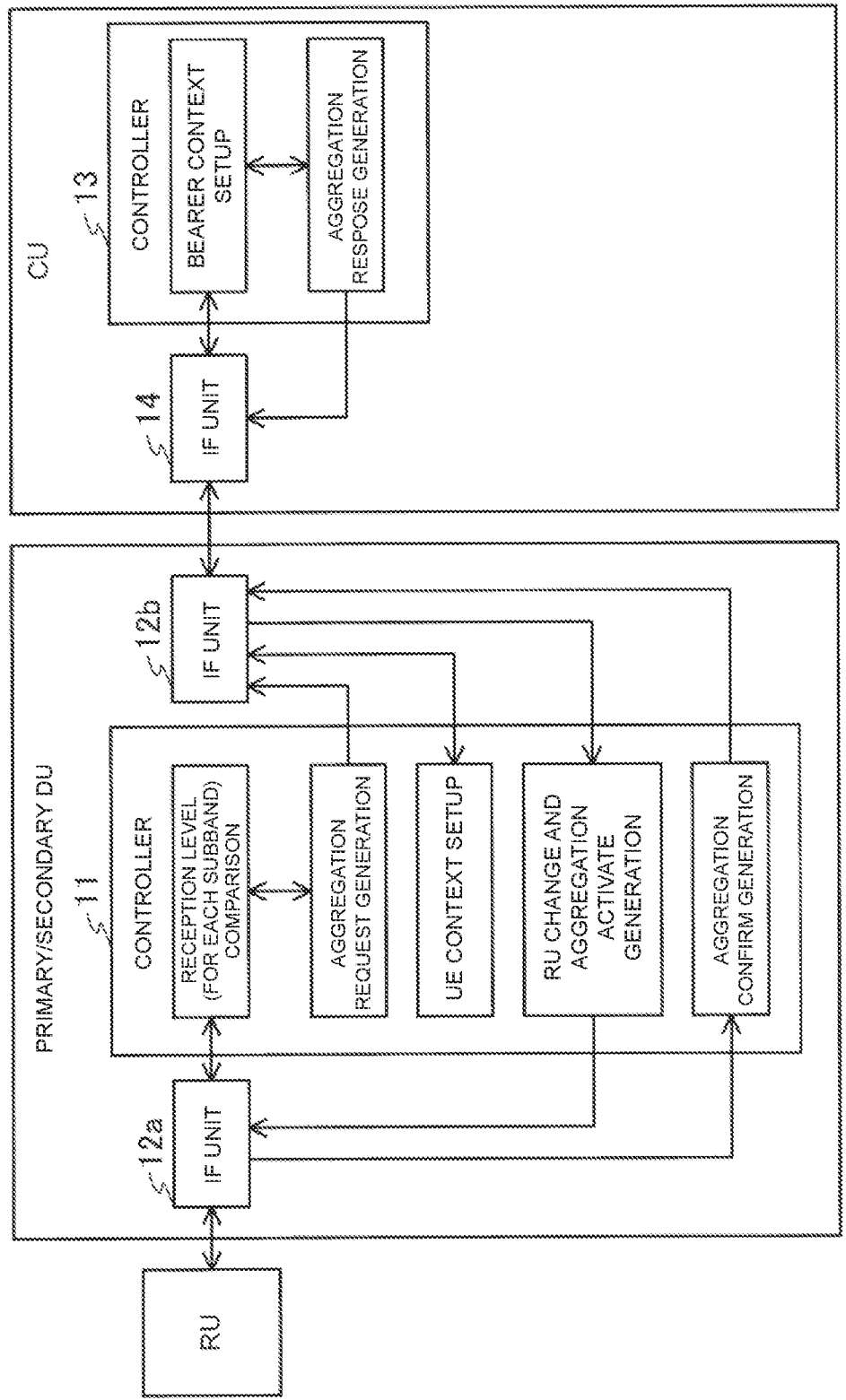
FIG. 19 is a block diagram illustrating a configuration example of a base station.

FIG. 19 is a block diagram illustrating a configuration example of a base station. In FIG. 19, the same components as those in FIG. 9 are denoted by the same reference numerals. In the block diagram of FIG. 19, the function of controller 11 is different from the function of controller 11 described with reference to FIG. 9. For example, the "AGGREGATION TRIGGER" illustrated in FIG. 9 is replaced by "RECEPTION LEVEL (for each subband) COMPARISON" in the block of FIG. 19.

Controller 11 acquires a reception level of a beam of the RU providing the multiple BWPs in the macro cell area, based on the CSI report notified from the terminal. Controller 11 compares the acquired reception level with the threshold X, and determines whether the condition 2 is satisfied.

Further, controller 11 acquires a reception level of a beam of an RU with which the terminal currently wirelessly communicates, namely, a reception level for a bandwidth corresponding to a bandwidth of the small cell, based on the CSI report notified from the terminal. Controller 11 compares the acquired reception level with the threshold Y, and determines whether the condition 3 is satisfied.

When the condition 2 and condition 3 are satisfied, controller 11 triggers the RU switching and the multiple BWP connection. Other functions of controller 11 are similar to the functions described with reference to FIG. 9, and the description thereof will be omitted.

The terminal has a configuration similar to the block configuration illustrated in FIG. 10. However, the function of controller 21 is partially different. Controller 21 of the terminal according to the fifth exemplary embodiment measures CSI of RUs for subbands and transmits a CSI report to the base station. The measurement for each subband enables the base station to acquire reception quality in accordance with the bandwidth for the BWP.

As described above, DU1 may determine the RU switching and the multiple BWP connection based on the condition 2 and the condition 3. This also enables the terminal to perform BWP aggregation.

Sixth Exemplary Embodiment

In a sixth exemplary embodiment, one DU forms multiple BWPs.

Figure 20:
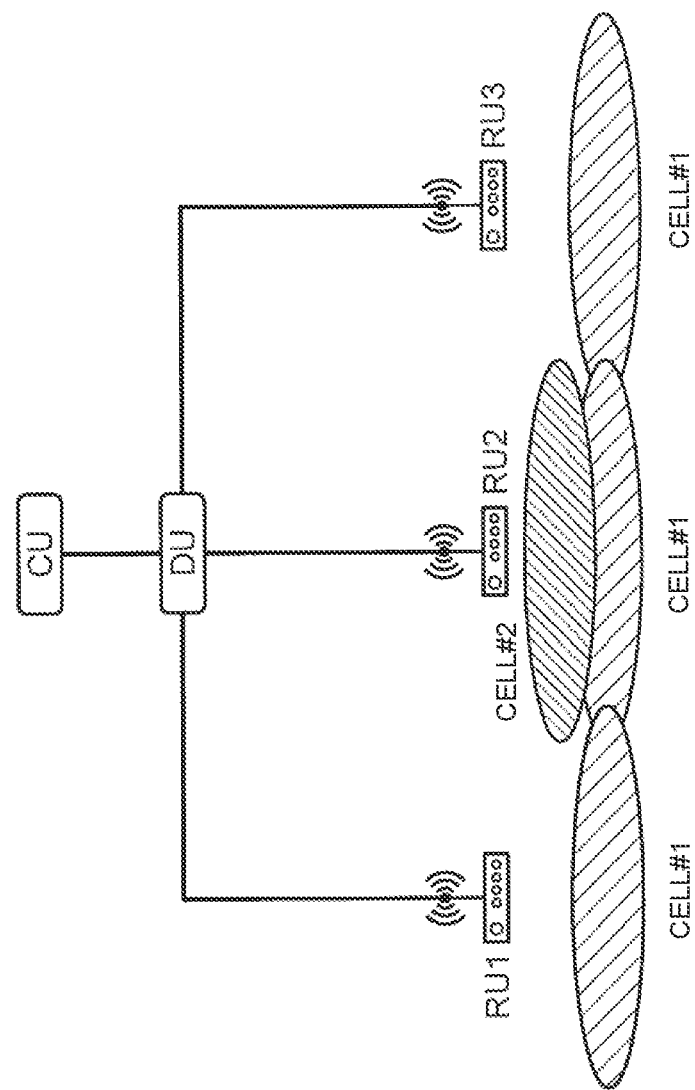
FIG. 20 is a diagram illustrating a configuration example of a wireless communication system according to a sixth exemplary embodiment.

FIG. 20 is a diagram illustrating a configuration example of a wireless communication system according to the sixth exemplary embodiment. The DU illustrated in FIG. 20 forms Cell #1 in a macro cell area in RU1. RU2, and RU3. Further, the DU illustrated in FIG. 20 forms Cell #1 in the macro cell area and Cell #2 in a small cell area in RU2. That is, one DU illustrated in FIG. 20 forms Cell #1 in the macro cell area and Cell #2 in the small cell area. In other words, the DU illustrated in FIG. 20 has functions of a primary DU and secondary DU. The DU illustrated in FIG. 20 may be in HLS or LLS.

Figure 21:
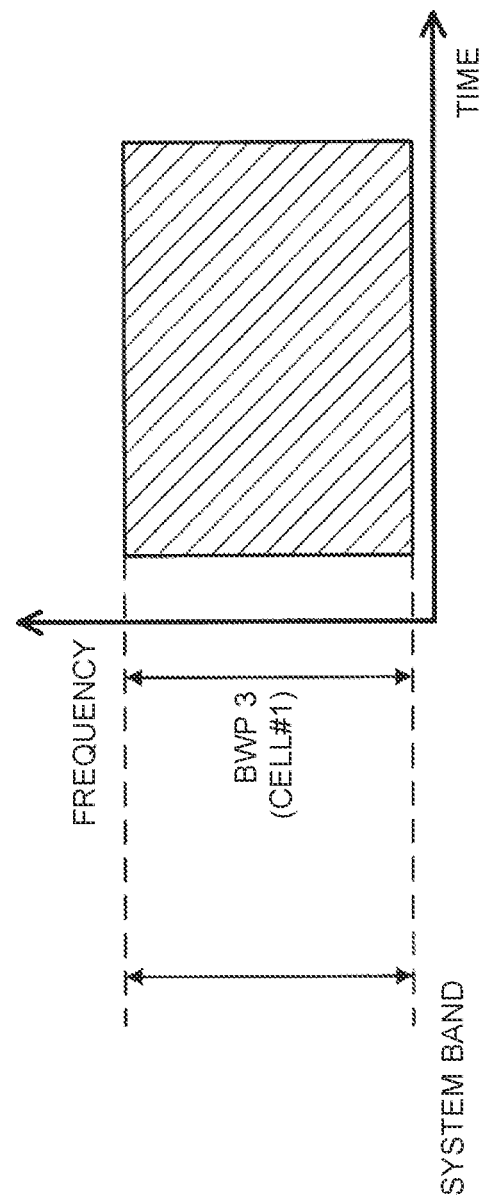
FIG. 21 is a diagram illustrating an example of radio resource allocation in an RU.

FIG. 21 is a diagram illustrating an example of radio resource (frequency) allocation in RU1 and RU3. The DU may allocate one BWP3 as illustrated in FIG. 21 in RU1 and RU3 among the plurality of RU1, RU2, and RU3.

Figure 22:
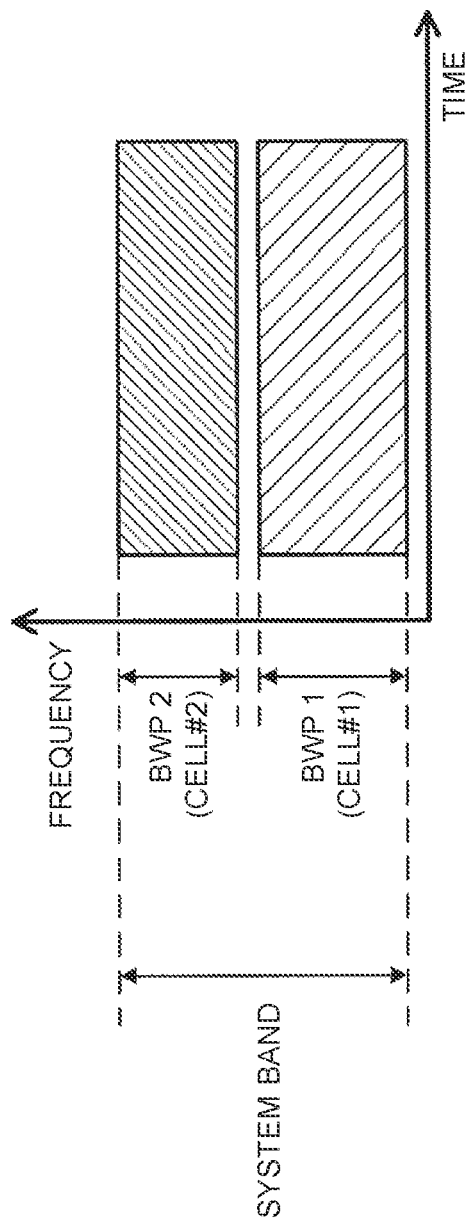
FIG. 22 is a diagram illustrating an example of radio resource allocation in the RU.

FIG. 22 is a diagram illustrating an example of radio resource (frequency) allocation in RU2. The DU may allocate two BWPs: BWP1; and BWP2 in RU2 among the plurality of RU1, RU2, and RU3 as illustrated in FIG. 22.

The wireless communication system illustrated in FIGS. 20 to 22 does not require new UE context and bearer setup for the secondary DU, and the UE context and bearer may be updated.

Figure 23:
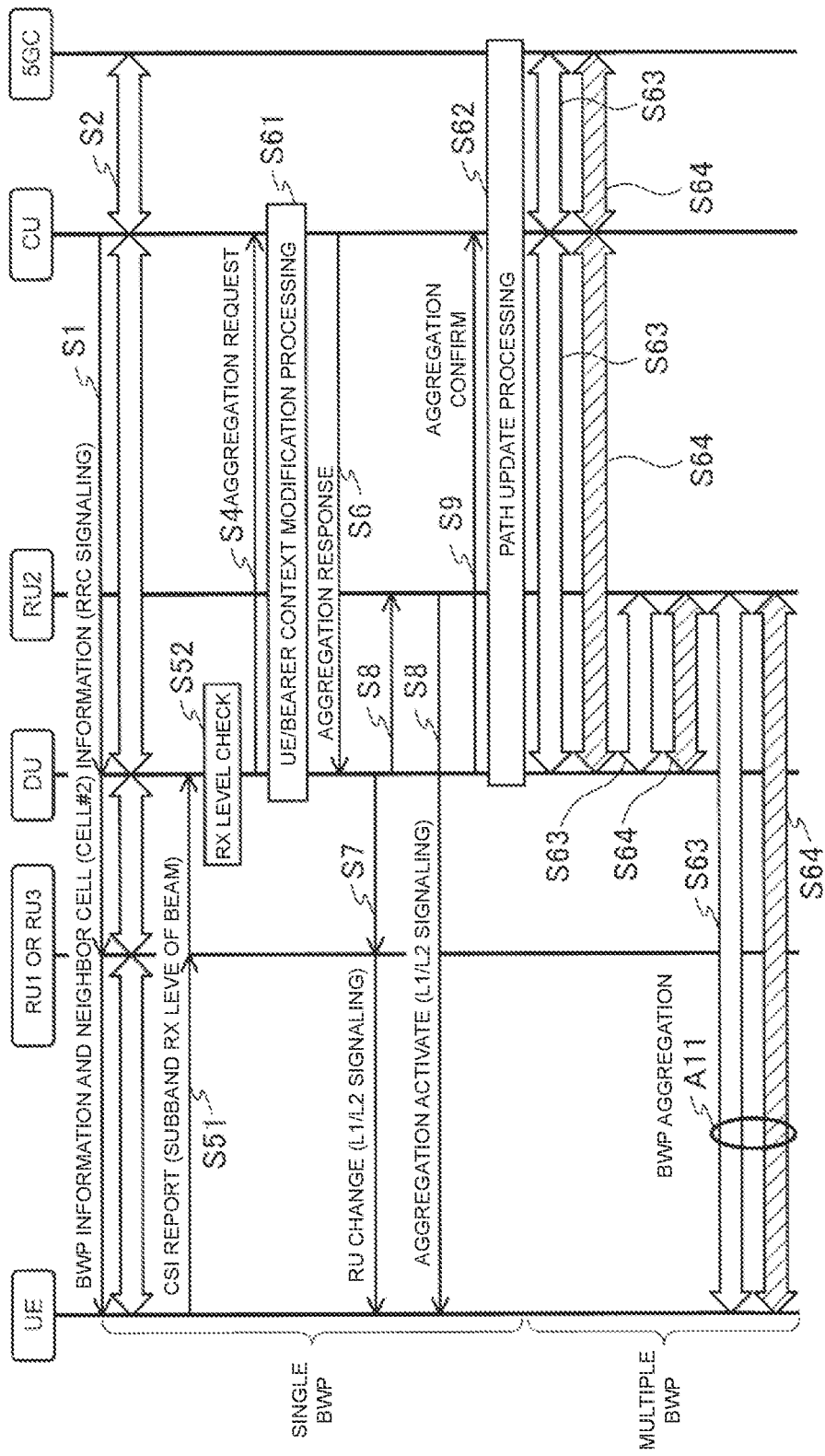
FIG. 23 is a diagram illustrating an example of a sequence of the wireless communication system according to the sixth exemplary embodiment.

FIG. 23 is a diagram illustrating an example of a sequence of the wireless communication system according to the sixth exemplary embodiment. In FIG. 23, the same processing steps as those in FIG. 18 are denoted by the same reference numerals.

The processing in S1, S2, S51, S52, and S4 illustrated in FIG. 23 is similar to the processing in S1, S2, S31, S32, and S4 described with reference to FIG. 18, and the description thereof will be omitted.

In response to the aggregation request in S4, the CU transmits UE context information (for example, security-related information) and bearer information to the DU, and updates (changes) the UE context and bearer (S61). Note that, in the sequence of FIG. 18, as illustrated in S5 of FIG. 18, the CU sets the UE context and bearer for the DU2 as the secondary DU.

The processing in S6 to S9 illustrated in FIG. 23 is similar to the processing in S6 to S9 described with reference to FIG. 18, and the description thereof will be omitted. However, in the sequence of FIG. 18, the CU transmits the message "aggregation confirm" to DU2 as the secondary DU, but does not transmit the message in the sequence of FIG. 23.

The DU and 5GC perform path update processing (S62). The UE and the 5GC perform communication through RU2, the DU, and the CU (S63 and S64). The UE and RU2 perform radio communication using two BWPs as illustrated in FIG. 22 (A11).

Figure 24:
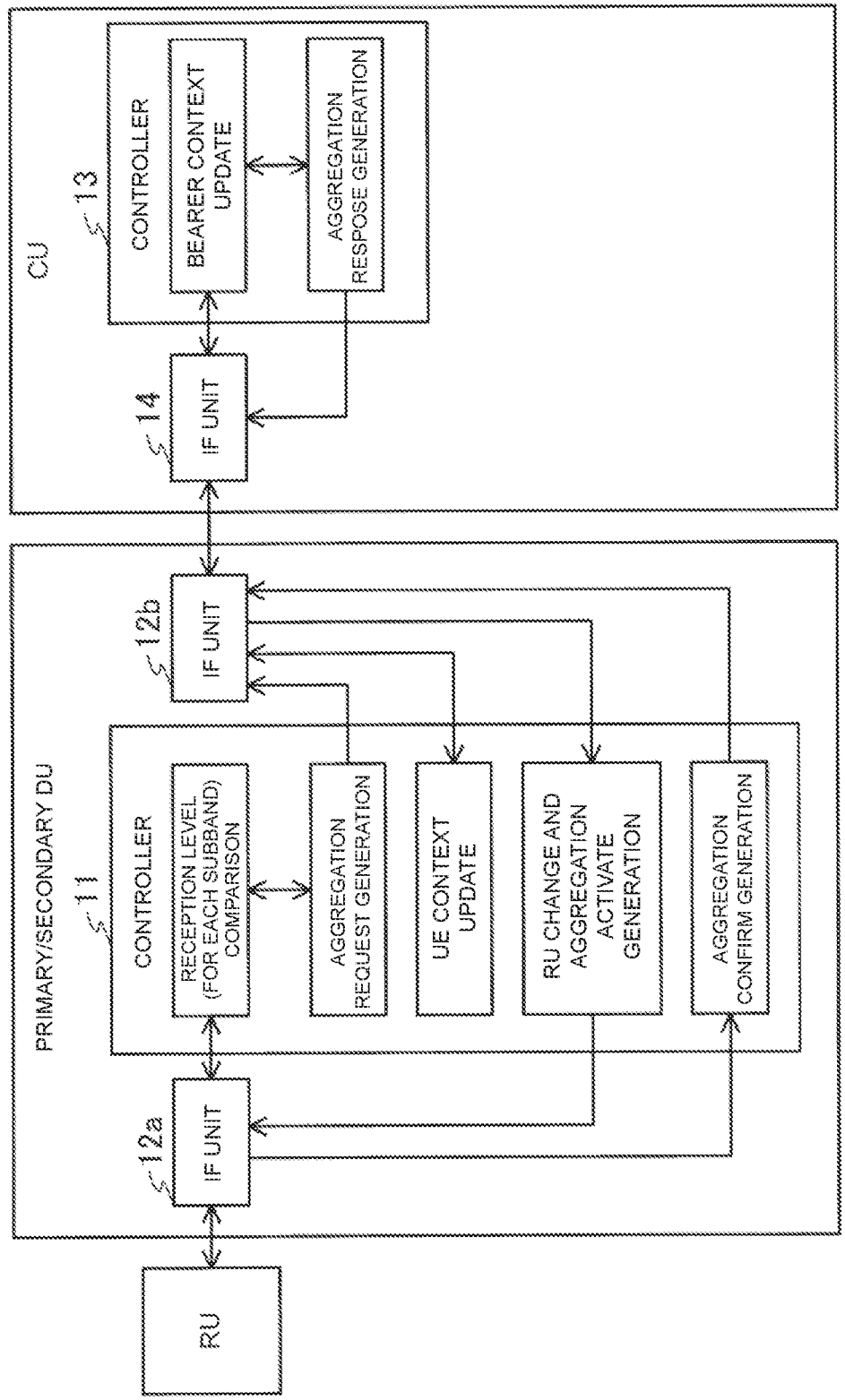
FIG. 24 is a block diagram illustrating a configuration example of a base station.

FIG. 24 is a block diagram illustrating a configuration example of a base station. In FIG. 24, the same components as those in FIG. 19 are denoted by the same reference numerals. In the block diagram of FIG. 24, functions of controllers 11, 13 are different from the functions of controllers 11, 13 described with reference to FIG. 19. For example, "UE CONTEXT SETUP" illustrated in FIG. 19 is replaced by "UE CONTEXT UPDATE" in the block of FIG. 24. Further, "BEARER CONTEXT SETUP" illustrated in FIG. 19 is replaced by "BEARER CONTEXT UPDATE" in the block of FIG. 24.

As described above, the wireless communication system according to the sixth exemplary embodiment does not require new UE context and bearer setup for the secondary DU. Controllers 11, 13 may update the UE context and bearer.

The terminal has a block configuration similar to the block configuration of the terminal described in the fifth exemplary embodiment, and the description thereof will be omitted.

As described above, one DU may form Cell #1 in the macro cell area and Cell #2 in the small cell area. Even in this case, the terminal can perform BWP aggregation.

Note that RU2 forming the multiple BWPs may provide multiple BWPs in one cell.

Figure 25:
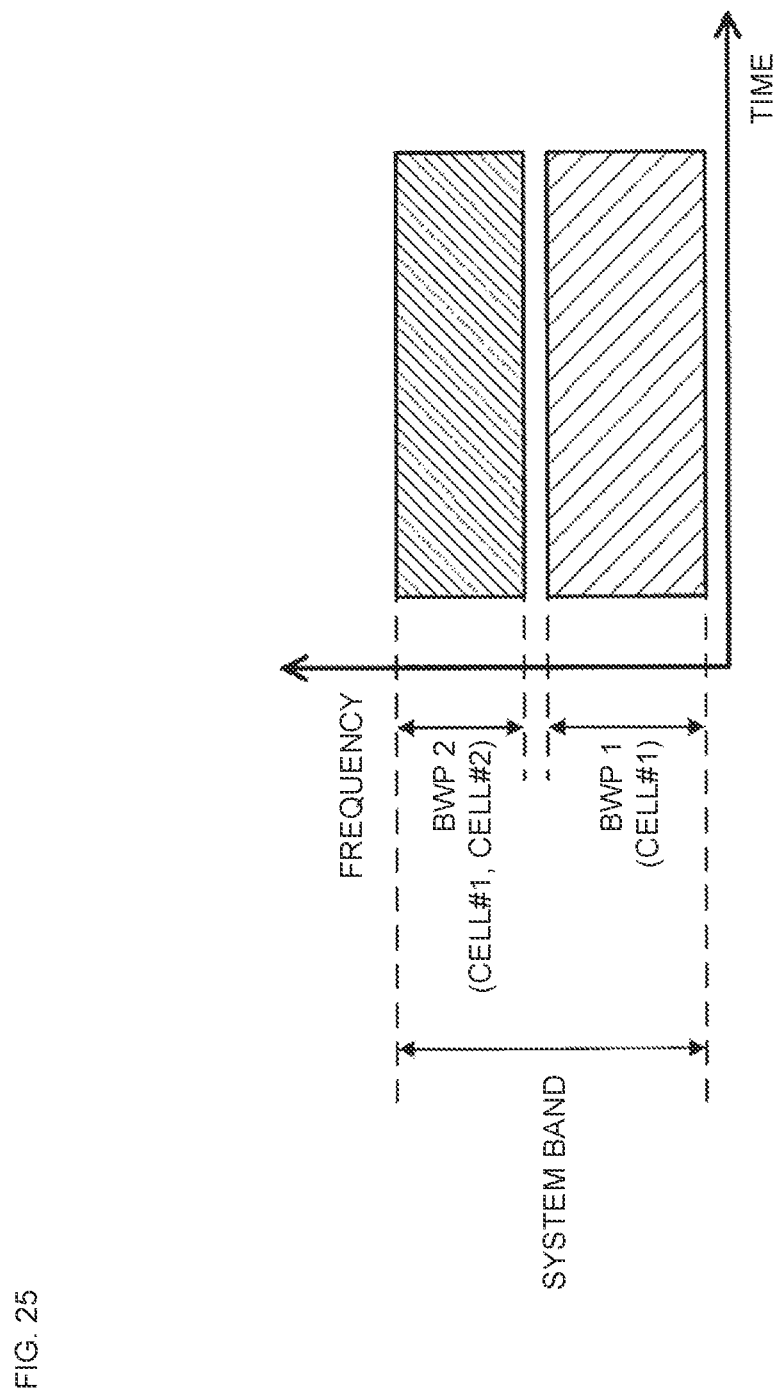
FIG. 25 is a diagram illustrating another example of radio resource (frequency) allocation in RU2.

FIG. 25 is a diagram illustrating another example of radio resource (frequency) allocation in RU2. As illustrated in FIG. 25, RU2 forming BWP1 and BWP2 may provide a BWP, which is identical to BWP2 provided by Cell #2 in the small cell area, in Cell #1 in the macro cell area. In other words, RU2 may provide BWP1 and BWP2 in Cell #1.

In this case, for example, when a terminal capable of performing the BWP aggregation is located in center Cell #1 illustrated in FIG. 20, the terminal communicates using two BWPs: BWP1 and BWP2 of Cell #1.

On the other hand, when a terminal incapable of performing the BWP aggregation and a terminal connected to the small cell area alone are located in, for example. Cell #1 at the center illustrated in FIG. 20, they communicate by using one BWP2 of Cell #2.

Although the exemplary embodiments have been described above, the exemplary embodiments may be combined. For example, the position information described in the fourth exemplary embodiment may be added to the trigger condition in the fifth exemplary embodiment. Further, for example, the third exemplary embodiment, the fourth exemplary embodiment, or the fifth exemplary embodiment may be combined with the sixth exemplary embodiment. The information used for the determinations of the conditions 1 to 3 may be regarded as information regarding the RU switching. Further, the RU switching may be a trigger condition for the multiple BWP connection.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The terminal (UE) that communicates with the base station in the present disclosure includes all types of apparatuses, devices, and systems (collectively referred to as a communication apparatus) having a communication function. The communication apparatus may include a radio transceiver and a processor and controller circuitry. The radio transceiver may include a receiver and a transmitter, or include receiving and transmitting functions. The radio transceiver (the transmitter and the receiver) may include a radio frequency (RF) module and one or more antennas. The RF module may include an amplifier, and an RF modulator and demodulator, or the like. Some non-limiting examples of such communication apparatus include a phone (e.g., cellular (cell) phone, smart phone), a tablet, a personal computer (PC) (e.g., laptop, desktop, netbook notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The present disclosure also may include an infrastructure facility, such as a base station, an access point, and any other apparatus, device or system that communicates with or controls apparatuses such as those in the above non-limiting examples.

A distributed station according to an embodiment of the present disclosure includes receiver circuitry which, in operation, receives information regarding wireless device switching from a terminal via a first wireless device, and controller circuitry which, in operation, determines, based on the information, switching from the first wireless device to a second wireless device and bandwidth part (BWP) aggregation in the second wireless device.

In an embodiment of the present disclosure, the controller circuitry notifies the terminal about the BWP aggregation using any signaling of layer 1, layer 2, or layer 3.

In an embodiment of the present disclosure, the first wireless device and the second wireless device form a first cell, and the information includes reception quality of the first wireless device in the first cell and reception quality of the second wireless device in the first cell.

In an embodiment of the present disclosure, the first wireless device and the second wireless device form a first cell, the second wireless device forms a second cell, and the information includes reception quality of the second wireless device in the first cell and reception quality of the first wireless device in the first cell. The reception quality of the first wireless device corresponds to a bandwidth of the second cell.

In an embodiment of the present disclosure, the information includes position information about the terminal.

An aggregation station according to an embodiment of the present disclosure includes receiver circuitry which, in operation, receives a setup request for BWP aggregation from a distributed station that controls a wireless device that wirelessly communicates with a terminal, and controller circuitry which, in operation, sets a terminal context and bearer regarding the BWP aggregation in response to the setup request.

A terminal according to an embodiment of the present disclosure includes receiver circuitry which, in operation, receives, from a distributed station via a wireless device, instruction information instructing wireless device switching and BWP aggregation, and controller circuitry which, in operation, performs communication based on the BWP aggregation with a wireless device as a switching destination, based on the instruction information.

A communication method according to an embodiment of the present disclosure is performed by a distributed station, and the communication method includes receiving information regarding wireless device switching from a terminal via a first wireless device, and determining, based on the information, switching from the first wireless device to a second wireless device and BWP aggregation in the second wireless device.

A communication method according to an embodiment of the present disclosure is performed by an aggregation station, and the communication method includes receiving a setup request for BWP aggregation from a distributed station that controls a wireless device that wirelessly communicates with a terminal, and setting a terminal context and bearer regarding the BWP aggregation in response to the setup request.

A communication method according to an embodiment of the present disclosure is performed by a terminal, and the communication method includes receiving, from a distributed station via a wireless device, instruction information instructing wireless device switching and BWP aggregation, and performing communication based on the BWP aggregation with a wireless device as a switching destination, based on the instruction information.

An embodiment of the present disclosure is useful in the wireless communication system.

What is claimed is:

1. A first distributed station to be used in a communication system including an aggregation station connected to a core network, the first distributed station, and a second distributed station; the first distributed station; the second distributed station; a first wireless device connected to the first distributed station; a second wireless device connected to the first distributed station and the second distributed station; and a terminal wirelessly connected to at least one of the first wireless device or the second wireless device, the first distributed station -comprising:
receiver circuitry which, in operation, receives, from the terminal via the first wireless device, information regarding switching from a wireless connection between the terminal and the first wireless device to a wireless connection between the terminal and the second wireless device; and
controller circuitry which, in operation, determines, based on the information, (i) switching from the wireless connection between the terminal and the first wireless device to the wireless connection between the terminal and the second wireless device and (ii) performing communication between the terminal and the core network through the second wireless device through a bandwidth part (BWP) provided by the first distributed station and a BWP provided by the second distributed station.

2. The first distributed station according to claim 1, wherein the controller circuitry notifies the terminal, using any signaling of layer 1, layer 2, or layer 3, about the performing of the communication between the terminal and the core network through the second wireless device through the BWP provided by the first distributed station and the BWP provided by the second distributed station.

3. The first distributed station according to claim 1, wherein
the first wireless device and the second wireless device form a first cell, and
the information includes reception quality of the first wireless device in the first cell and reception quality of the second wireless device in the first cell.

4. The first distributed station according to claim 1, wherein
the first wireless device and the second wireless device form a first cell,
the second wireless device forms a second cell, and
the information includes reception quality of the second wireless device in the first cell and reception quality of the first wireless device in the first cell, the reception quality of the first wireless device corresponding to a bandwidth of the second cell.

5. The first distributed station according to claim 1, wherein the information includes position information about the terminal.

6. An aggregation station to be used in a communication system including the aggregation station connected to a core network, a first distributed station connected to the aggregation station, a second distributed station connected to the aggregation station, a first wireless device connected to the first distributed station, a second wireless device connected to the first distributed station and the second distributed station, and a terminal wirelessly connected to at least one of the first wireless device or the second wireless device, the aggregation station comprising:
receiver circuitry which, in operation, receives, from the first distributed station that controls the first wireless device that wirelessly communicates with the terminal, a setup request for performing communication between the terminal and the core network through the second wireless device through a bandwidth part (BWP) provided by the first distributed station and a BWP provided by the second distributed station; and
controller circuitry which, in operation, sets, in response to the setup request, a terminal context and bearer regarding the performing of the communication between the terminal and the core network through the second wireless device through the BWP provided by the first distributed station and the BWP provided by the second distributed station.

7. A terminal to be used in a communication system including an aggregation station connected to a core network, a first distributed station connected to the aggregation station, a second distributed station connected to the aggregation station, a first wireless device connected to the first distributed station, a second wireless device connected to the first distributed station and the second distributed station, and the terminal wirelessly connected to at least one of the first wireless device or the second wireless device, the terminal comprising:
receiver circuitry which, in operation, receives, from the first distributed station via the first wireless device, instruction information instructing (i) switching from a wireless connection between the terminal and the first wireless device to a wireless connection between the terminal and the second wireless device and (ii) performing of communication between the terminal and the core network through the second wireless device through a bandwidth part (BWP) provided by the first distributed station and a BWP provided by the second distributed station; and
controller circuitry which, in operation, performs, based on the instruction information, the communication between the terminal and the core network through the second wireless device through the BWP provided by the first distributed station and the BWP provided by the second distributed station.

8. A communication method performed by a first distributed station to be used in a communication system including an aggregation station connected to a core network, the first distributed station, and a second distributed station; the first distributed station; the second distributed station; a first wireless device connected to the first distributed station; a second wireless device connected to the first distributed station and the second distributed station; and a terminal wirelessly connected to at least one of the first wireless device or the second wireless device, the communication method comprising:
receiving, from the terminal via the first wireless device, information regarding switching from a wireless connection between the terminal and the first wireless device to a wireless connection between the terminal and the second wireless device; and determining, based on the information, (i) switching from the wireless connection between the terminal and the first wireless device to the wireless connection between the terminal and the second wireless device and (ii) performing communication between the terminal and the core network through the second wireless device through a bandwidth part (BWP) provided by the first distributed station and a BWP provided by the second distributed station.

9. A communication method performed by an aggregation station to be used in a communication system including the aggregation station connected to a core network, a first distributed station connected to the aggregation station, a second distributed station connected to the aggregation station, a first wireless device connected to the first distributed station, a second wireless device connected to the first distributed station and the second distributed station, and a terminal wirelessly connected to at least one of the first wireless device or the second wireless device, the communication method comprising:

receiving, from the first distributed station that controls the first wireless device that wirelessly communicates with the terminal, a setup request for performing communication between the terminal and the core network through the second wireless device through a bandwidth part (BWP) provided by the first distributed station and a BWP provided by the second distributed station; and setting, in response to the setup request, a terminal context and bearer regarding the performing of the communication between the terminal and the core network through the second wireless device through the BWP provided by the first distributed station and the BWP provided by the second distributed station.

10. A communication method performed by a terminal to be used in a communication system including an aggregation station connected to a core network, a first distributed station connected to the aggregation station, a second distributed station connected to the aggregation station, a first wireless device connected to the first distributed station, a second wireless device connected to the first distributed station and the second distributed station, and the terminal wirelessly connected to at least one of the first wireless device or the second wireless device, the communication method comprising:

receiving, from the first distributed station via the first wireless device, instruction information instructing (i) switching from a wireless connection between the terminal and the first wireless device to a wireless connection between the terminal and the second wireless device and (ii) performing of communication between the terminal and the core network through the second wireless device through a bandwidth part (BWP) provided by the first distributed station and a BWP provided by the second distributed station; and performing, based on the instruction information, the communication between the terminal and the core network through the second wireless device through the BWP provided by the first distributed station and the BWP provided by the second distributed station.

* * * * *